United States Patent [19]

Faustini

[11] 3,757,231

[45] Sept. 4, 1973

[54] ASYNCHRONOUS CIRCUIT AND SYSTEM

[75] Inventor: Carlo Faustini, Silver Spring, Md.

[73] Assignee: Dyad Systems, Inc., Columbia, Md.

[22] Filed: Mar. 26, 1970

[21] Appl. No.: 22,991

Related U.S. Application Data

[63] Continuation-in-part of Ser. No. 816,573, April 16, 1969, abandoned.

[52] U.S. Cl. ................................ 328/37, 328/221 C

[51] Int. Cl. ................................ G11c 19/00

[58] Field of Search ................ 328/37, 42; 307/215, 307/254, 221 C

[56] References Cited

UNITED STATES PATENTS

| | | | |
|---|---|---|---|
| R26,082 | 9/1906 | Osborne | 328/37 |
| 2,823,855 | 2/1958 | Nelson | 328/37 |
| 3,268,740 | 8/1966 | Rywac | 328/37 |
| 3,378,776 | 4/1968 | Goldberg et al. | 328/42 |
| 3,450,897 | 6/1969 | Henn | 307/215 |

OTHER PUBLICATIONS

Crutchfield, Jr., "Modulo 2 Adder for DTL Shift Register" pp. 1949/1950 Vol. 8, No. 12, May 1966, IBM Technical Disclosure Bulletin.

Faustini "Practical Asynchronous Switching Nets" August 1964, pages 1 to 46.

McNaughton, "Badly Timed Elements and New Timed Nets" pages 149 to 153, 1964.

*Primary Examiner*—John W. Huckert

*Assistant Examiner*—Ro E. Hart

*Attorney*—Rose & Edell

[57] ABSTRACT

An asynchronous logic circuit is provided having three stable states, namely two information states and a neutral state. Information is transferred between cacaded such circuits wholly under the control of such circuits and at a rate determined by the delay times through various gates. Feedback is employed between each circuit so that for any two given circuits the transfer logic is IN → NI, I representing an information state and N representing the neutral state. Reversible cascaded chains are discussed as well as parallel feed-in and feed-out of information, and fan-in, fan-out and recirculating loops of information. The cascaded circuits (nets) employ interface circuits comprising in most instances a specified part of the basic net circuit.

24 Claims, 18 Drawing Figures

PATENTED SEP 4 1973 3,757,231

SHEET 06 OF 11

ASYNCHRONOUS CIRCUIT AND SYSTEM

CROSS REFERENCE

The present application is a continuation-in-part of my co-pending application Ser. No. 816,573, filed Apr. 16, 1969, now abandoned.

BACKGROUND OF THE INVENTION

The present invention relates generally to asynchronous circuits and logic and more particularly to an asynchronous circuit employing a plurality of logic gates interconnected such as to insure a high degree of reliability in transfer and storage of digtal information, and further relates to a family of logic systems employing said circuits; which systems may be readily interfaced with one or more external synchronous or asynchronous system elther in the parallel or serial mode of operation.

Asyncronous circuits and systems have been the subject of considerable investigation in recent years due to the theoretical increase in speed of operation which can be achieved with such circuits. The results of such investigations have been the subject of several publications and at least one patent. The results of previous work in this field by the present inventor formed the subject matter of his Master's Thesis at the University of Pennsylvania, August, 1964, entitled "Practical Asynchronous Circuits." The circuits of the Thesis suffer from many of the defects and problems encountered in the work of others in this field, some of this work being described immediately below.

U. S. Pat. No. 3,378,776 to Goldberg et al. describes a prior art asynchronous systems wherein logic circuits are employed to transmit and store binary information. In this system, (hereinafter referred to as the "anti-parallel" system) there is provided a plurality of cascaded storage stages including storage elements and control circuits for controlling transfer of information from one stage to another in response to a gate pulse applied to the last stage of the cascade and transmitted on a stage-by-stage basis toward the first stage of the cascaded circuit. Information is stored as a binary 1 or binary 0 and upon the application of the gate pulse to the last stage, the information in that stage is transferred to a read-out circuit. After a short delay the gate pulse is regenerated and applied to the preceding stage so that information stored therein is transferred to the last stage and so on up the chain. Thus the control pulses proceed in a direction opposite to the direction of propagation of the information.

As in other prior art asynchronous devices difficulties arise due to pulse "races" both intrastage and interstage. This difficulty stems from time delays through various gates in a stage and the accumulated time delays in one stage relative to accumulated time delays in an adjacent stage. Each stage has a minimum recovery time between the time of application of a gate pulse and the time at which a new unit of information may be received; i.e., the circuit can respond to a second pulse gate. If a gate pulse is applied to a specific stage before the end of the minimum recovery time, the stage would not normally be able to respond, information would be lost and the gate pulse would not be transmitted to the preceding stage.

In response to occurrence of the above situation, a space symbol is automatically generated and introduced into the chain of information. The space symbol is a specified combination of voltage levels on the information leads and is different from the voltage levels for either the binary 1 or the binary 0. For instance, assume that the information circuit comprises two leads emanating from an information storage circuit. If a binary 1 is stored by the circuit, one lead has a binary 1 and the other lead has a binary 0 developed thereon. If a binary 0 is to be transmitted the above arrangement is reversed. If a space symbol is to be transmitted both leads have a binary 0 applied thereto.

By the use of the above arrangement it is possible to prevent loss of information but the speed of operation of the circuit is greatly reduced due to dispersion of the information along the stages. The reduction of speed of operation becomes increasingly severe as the circuits age since each circuit, in fact each gate in each circuit, is affected differently so far as time response is concerned, by the aging process. Thus as circuits age in an anti-parallel system the speed of operation declines steadily.

The anti-parallel system has a further disadvantage which is associated with the manner of control of transmission of information. Information is transmitted down the chain only in response to application of a gate pulse to the last stage from an external source. Thus the system is actually "clocked" by the read-out on external circuits and cannot operate at the inherent speed of asynchronous circuitry which ideally is faster than synchronous circuits. In consequence, much of the time advantage ascribed to such circuits is lost not only due to external clocking but also due to the fact that the asynchronous circuit cannot function (transfer information) until the read-out circuit is ready to receive information. It is thus not only possible but probable that an anti-parallel chain may remain devoid of information even though the circuit which is to feed information thereto is ready to supply information, and the chain is ready to receive information, only because the read-out circuit is not ready to receive new information.

Another asynchronous circuit of the prior art which is of interest is the circuit of Muller described in his article "Asynchronous Logics and Application to Information Processing," Switching Theory in Space Technology, 1963 Standford University Press.

Muller provides a true asynchronous circuit in that transmission of information down a cascaded chain of stages is primarily under the control of the stages themselves. Muller also employs circuits having three stages; a binary 1 state, a binary 0 state and a neutral state N. However Muller also has trouble with pulse "races" within each stage and between stages and in order to overcome such problems, Muller, as did the present inventor in his prior art circuit of the RBF-2 of the Thesis, employs both feedback and feedforward control signals and prescribes certain rules for transmission of information as determined by the conditions of any three adjacent stages. Specifically, Muller permits transfer of informaiton only when the following combinations of states exist in three adjacent stages:

1. INN

2. NII wherein I is an information state (binary 1 or 0) and N is a neutral state.

When the first combination of states above is developed in the Muller device, a shift occurs to the IIN combination, whereas the NII combination shifts to the NNI combination. No other combination of states permits a further transmission of information. Thus if four stages are considered having the following arrangement of information $I_1NNI_2$ the information $I_1$ proceeds to the second stage $I_1I_1NI_2$, but cannot progress further toward the stage storing $I_2$ until the information $I_2$ is removed from the last stage being considered above. If the last stage above is the last stage of the chain, then upon removal of the information $I_2$ from the last stage, the information $I_1$ is transmitted to the last stage through the next to the last stage. If the last stage above is in the middle of a chain, then the succeeding two stages must assume their neutral stages before information $I_2$ can be transmitted.

Thus the aforesaid circuits, due to constraints placed on the system to avoid dangerous pulse races must sacrifice speed for accuracy. Further the gate logic is complex and therefore expensive.

With both the anti-parallel and the Muller circuits, difficulties and real complexities are encountered at the interfaces with other types of logic both relative to the input and output functions. Further parallel read-in and read-out and fan-in and fan-out can be realized only at such great cost and loss of speed of operation that the advantages expected to be achieved with asynchronous circuits are all but lost.

It is an object of the present invention to provide an asynchronous circuit that is simple, inexpensive and which is substantially free of intrastage and interstage pulse races.

It is yet another object of the present invention to provide an asynchronous circuit and system employing cascaded asynchronous circuits in which intrastage and interstage races are inherently eliminated due to the fact that pulses which might othersise produce races are always transmitted through different numbers of identical gates.

It is another object of the present invention to provide an asynchronous circuit which transfers information from stage-to-stage at a rate determined wholly by the internal timing of the circuits.

It is still another object of the present invention to provide a tristable asynchronous circuit and logic having binary information states and a neutral state in which the intercircuit logic is wholly defined by the interaction between any two adjacent stages.

Yet another object of the present invention is to provide a tristable asynchronous circuit and system wherein any two adjacent stages have stored therein I and N in the first and second stages, respectively, information is immediately transferred such that the stages assume the pattern N and I respectively, regardless of the condition of any one or more other stages of the cascade of circuits.

It is another object of the present invention to provide cascade asynchronous stages in which information received at the first stage of the circuit is transmitted, at a rate determined wholly by the internal logic of the apparatus, to the first succeeding stage of the cascaded stages which is not storing information.

It is still another object of the present invention to provide an asynchronous circuit and system of cascaded stages which, when operated with synchronous systems having a clock pulse rate slower than the transmission rate of the asynchronous system, appears as an elastic memory since the cascaded asynchronous device appears to have a number of stages equal only to the number of units of information stored therein.

Still another object of the present invention is to provide an asynchronous circuit which may be readily fed information in serial or parallel and have information readily extracted in serial or parallel.

It is yet another object of the present invention to provide an asynchronous circuit and system which may be interfaced with external circuits by means of quite simple interface circuits.

It is another object of the present invention to provide a tristable asynchronous circuit which upon receipt of the information stored therein by a succeding stage always resets itself to a neutral state and signals the preceding stage that it is available to receive additional information.

It is still another object of the present invention to provide an asynchronous circuit having a storage section, a gate (out) section and a control section, the latter of which is responsive to reciept of information by the succeeding stage to terminate transfer of information to the succeeding stage and one gate interval later to reset its stage to neutral so that it may now receive information from the preceding stage.

It is yet another object of the present invention to provide cascaded asynchronous stages in which the transmission rate of information is greater than the rate at which each stage can be completely cycled.

Still another object of the present invention is to provide cascaded asynchronous circuits which may transmit information in either the forward or reverse directions.

Yet another object of the present invention is to provide a plurality of parallel cascaded asynchronous logic circuits which although asynchronous in operation are constrained to transmit information through certain stages of one chain in synchronism with the corresponding stages of the parallel chain or chains.

According to one preferred realization of the present invention there is provided an eight NAND gate circuit including a storage section, an output gate section and a control section. The storage section comprises three gates cross-coupled to provide a flip-flop like arrangement having to develop on two information lead signals, three stable states, 1-0 (I), 0-1 (I) and 1-1 (N). The gate section comprises two gates, each for gating out signals on a different one of the information leads. The output gates are controlled by the control section and a third gate of the storage section whose output lead is not one of the information leads.

The control section employs three gates, two of which are cross-coupled and in conjunction with the third gate provide a circuit which through part of an information transfer cycle is bistable and through another part of the cycle is monostable.

The third gate of the storage section senses the voltages on the output leads of the other two storage section gates and when the voltages on the information leads indicate the neutral state, such thrid gate signals the preceding stage that its stage is ready to receive information. When information is recieved by the stage, this third gate blocks further is recieved by the stage, this third gate blocks further information transfer from the preceding stage and applies a gate to the output gates of its own stage. The output gates are not opened however until the succeeding stage transmits a signal indicating that it is in the neutral state and that it can receive information. At this point the control section of the stage opens the output gates of the stage and permits information to be transmitted. The succeeding stage, upon receiving such information, changes its signal to the stage under consideration whose control section then closes the output gates and resets the storage gates to the neutral state. The control section thereafter again opens the output gates when the signal from the succeeding stage signifies that such stage is in its neutral state, and therefore ready to recieve new information.

An important feature of the operation described above is that each stage is reset to the neutral state between successive information states. The neutral state is a stable state in the device of the present invention and thus stage is set to an information state only in response to positive recognition of the transfer of information from a preceding stage. The above procedure is in contradistinction to the prior art devices in which a preset time interval is provided between transmission of information signals and in which if the information in a prior stage has not changed during this interval the same information may be transmitted twice.

As a result of the operation of the present invention, each stage of the system is either isolated from or placed in communication with a preceding or succeeding stage in dependence only upon the internal state of each stage. As soon as an adjacent succeeding stage is ready to receive information, the information is made available regardless of the condition of the stage preceding the stage in question. Thus the cascaded circuit of the present invention may be treated in pairs of stages rather than in triplets of stages as in Muller, as in the present inventor's prior work.

Specifically, the transmission of information in the present invention follows as to any two stages, the pattern IN → NI throughout the length of the chain. In consequence information is transferred along the line of progression to the last stage which does not have information, completely independently of the operation of external circuits.

A further feature of the invention resides in the fact that parallel feed-in or feed-out of information may be readily achieved. As to parallel input, since the storage gates are the input elements of each stage, information may be applied directly to these gates without any problems. Also, since information stored in each stage is always available to external circuits, parallel read-out is easily accomplished.

Fan-in and fan-out of information are also simple tasks for the circuits. By employing interrelated interface devices, which, as will become apparent from the detailed description of the circuits, are quite simple, the cascaded stages may accept or gate out information in the alternative from or to two or more input or output circuits on a one-for-one or block-by-block basis. Thus the circuits find immediate use in multiplexing, de-multiplexing and adder functions.

Due to the interconnection of the three parts of each stage, information is transmitted through a stage in less than the overall cycle time of the stage. It was stated above that the stage gates have their input leads and output leads cross-coupled so that information applied to the storage gates is also applied at the same time to their output leads. Thus the only delay in transferring information is first through the thrid storage gate which opens the output gates (assumming the succeeding stage is ready to receive information) and then through the output gates to the next stage. Thus full transmission of a unit of information is accomplished in two gate delay intervals, or a few nanoseconds, even through the complete cycling of a stage takes somewhat longer due to delay in the feedback signal from the succeeding stage and resetting of the stage to neutral before the next unit of information can be accepted.

The pulse or signal race problem is greatly reduced if not eliminated in the present cycle and systems, since any group of events proceeding from the receipt of a specified signal are accomplished, although concurrently, through different numbers of gates. For instance, when a signal is received from a succeeding stage indicating that such stage has received information, the stage under consideration produces a pulse closing its output gates and resetting the storage gates to neutral. The closing of the output gates must occur before the resetting of the storage gates. In accordance with the control circuit, the gate-closing signal closes the gates after a one gate delay but the storage gates are reset only after a two gate delay, one gate in the control section and the storage gates themeselves. The above procedure is followed throughout the circuits of the system and embodiments are disclosed which insure proper operation even in those instances where excessive differences in gate delays might be encountered due to excessive aging.

An additional feature of the invention resides in the control section of the circuits. The circuits of the control section, as a separate unit, has been found to be highly useful as an interface device for both read-in and read-out information to or from the circuits as is described in detail subsequently. As previously indicated, the control section circuit operates as a flip-flop over a part of its cycle and as a monostable device over another part of its cycle of operation. As such, it may be set into one or another state when certain conditions exist in the circuit (when information is being inserted into the system but the circuits which are to accept readout are not ready) but operates as a self recycling device when readout has been accepted. In the interface situation this type of circuit is ideal because it can stabilize a system in one of two quiescent states but can cycle the system when a transient operation is required such as information transfer and subsequent termination of transfer and resetting of the storage gates to neutral.

As indicated above, the control section of the circuit of the present invention may be utilized as a separate entity apart from the circuit. Conversely the control section may be replaced for particular application to achieve special effects.

The apparatus of the invention is capable, with minor modification, of transmitting information in one or the other direction in dependence upon external control signals and may operate as an asynchronous reversible shift register without losing any of the benefits of the basic circuit.

The embodiments of the invention initially set forth above have wide applicability to many systems only a few of which are described herein. Specifically the circuit may be employed as an elastic shift register, in a multiplexer or demultiplexer, for fan-in, fan-out and recirculating information loops and in parallel synchronized circuits as in an adder. In summary, the present invention provides an asynchronous circuit or circuits and systems employing the same, which are very fast, highly reliable and unusually versatile, may be readily interfaced with conventional digital circuits with little additional and uncomplicated sandardized circuitry, and which is devoid of most of the problems which have plagued prior art asynchronous devices.

An additional feature of the present invention is the use of specific NAND gates wired in a predetermined manner to produce a quasi-NOR function. More particularly, the output leads of two NAND gates are directly connected together so that if one of the gates has signals (1's) applied to all of its input leads the output signal of the combination of gates is determined (0) regardless of the condition of the input leads of the other NAND gate. The utilization of the above specific combination of gates permits elimination of buffering gates and the delay which attends addition of any gates to the circuit. Since high speed operation is an important feature of the invention, elimination of over one gate delay per stage is important.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DESCRIPTION OF THE PREFERRED EMBODIMENTS

Figure 1:
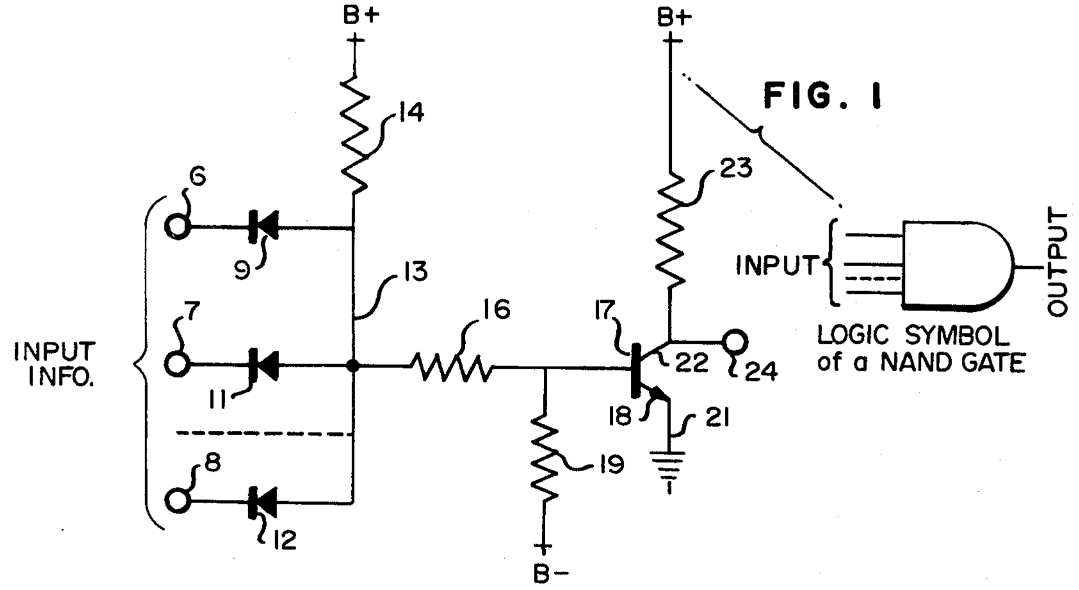
FIG. 1 is a circuit diagram of a NAND gate employed in the circuits of the present invenion.

Referring now specifically to FIG. 1 of the accompanying drawings, there is illustrated a typical NAND gate which may be employed in realization of the apparatus of the present invention. For purposes of illustration only, the NAND gate is illustrated as having three input terminals 6, 7 and 8. Each of the terminals 6, 7 and 8 is connected through diodes 9, 11 and 12, respectively, to a common bus 13 which is connected to a high voltage source B+ through a resistor 14. The bus 13 is connected also through another resistor 16 to a base electrode 17 of an NPN transistor 18. The base electrode 17 of the transistor 18 is connected through a resistor 19 to a low voltage source indicated as B–. The transistor 18 has an emitter electrode 21 connected directly to ground and a collector electrode 22 connected through a resistor 23 to the B+ source. An output voltage is derived from the collector electrode 22 on an output terminal 24.

In the NAND gate illustrated, the diodes 9, 11 and 12 have their cathodes connected to the terminals 6, 7 and 8, so that the quiescent state is established when all of the input terminals have a positive voltage applied thereto. In this connection none of the diodes 9, 11 and 12 are conductive and a resistance divider network comprising the resistances 14, 16 and 19 determines the voltage applied to the base electrode 17 of the transistor 18. The relative values of the resistors 14, 16 and 19 are chosen such that the base electrode 17 render the NPN transistor 18 conductive, thereby causing a voltage drop across the resistor 23 and establishing a voltage on the output terminal 24 which is well below the value of B+. This state is hereinafter referred to as the "zero" state of the device. Alternately, it will be said that the output of the gate is a 0 or that a 0 signal appears at the output of the gate.

If now a zero voltage is applied to any one of the input terminals 6, 7 and 8, a conductive path is established from B+ through the resistor 14, the diode associated with the particular input terminal that receives the low voltage and through the source output impedance to ground. The path through the diode and output impedance of the source is lower than the impedance of the resistors 16 and 19, and the voltage on the bus 13 falls below its level when all of the diodes were blocked. The drop in voltage on the bus 13 reduces the voltage on the base electrode 17 of the transistor 18 and renders the transistor nonconductive. In consequence, the voltage on the output terminal 24 becomes essentially B+ voltage. This state is hereinafter referred to as the "one" state of the device. Alternately, it will be said that the output of the gate is a 1 or that a 1 signal appears at the output of the gate.

In summary, it can be seen that if positive voltages (1 signals) are applied to all of the input terminals 6 through 8, a low or zero voltage, i.e. a 0 signal, is established at the output terminal 24. If, however, one or more of the input terminals has a low voltage, i.e. a 0 signal, established on its input terminal, the voltage at the output terminal rises to approximately B+ voltage establishing a 1 signal on the output terminal.

An additional feature of the NAND gate illustrated in FIG. 1, is that the voltage on the output terminal 24 may be driven to the low voltage condition regardless of the voltage values on the input terminals by simply connecting the output termial to a low voltage source. In this case, conduction from B+ through the resistor 23 and thence through the terminal 24 to the low voltage source, constrains or drops the voltage on the output terminal 24 to that of the low voltage source. This feature is employed subsequently in discussion of the remaining circuits of this application.

Figure 2:
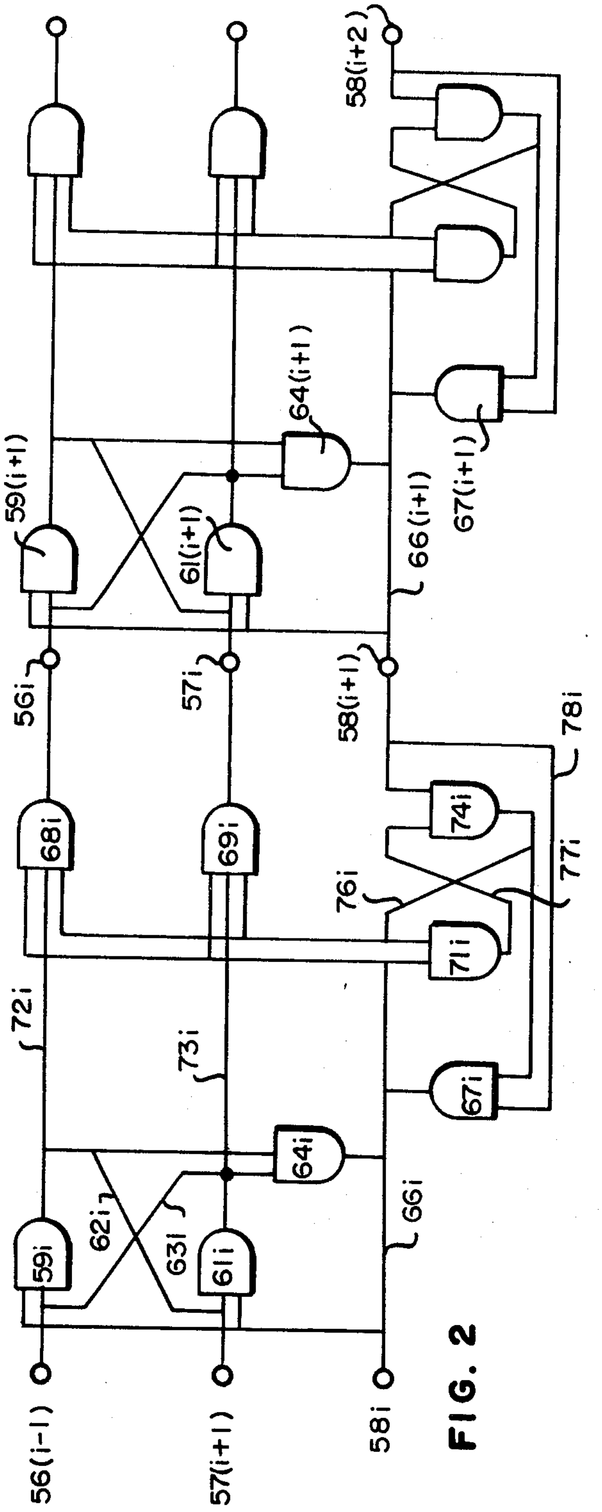
FIG. 2 is the logic block diagram of a preferred embodiment of the circuit of the present invention.

Referring now specifically to FIG. 2 of the accompanying drawings, there is illustrated a logic diagram of the switching networks of the present invention. Actually two such networks are illustrated in FIG. 2 for purposes of description of operation. The numeric designations applied to the elements of the left network as illustrated in FIG. 2, carry the additional designation "*i*" to indicate these elements belong to the first stage of a chain of stages, whereas the corresponding and identical elements of the right network as illustrated in FIG. 2 carry the additional designation (*i*+1) and subscripts applying to preceding or subsequent gates in the chain carry the designations (*i*-1) and (*i*+2), respectively.

The net of the present invention has three input terminals 56(*i*-1) and 57(*i*—1) and 58(*i*+1). The terminals 56(*i*—1) and 57(*i*—1) are information input terminals and the terminal 58(*i*+1) is a feedback terminal; a feed-forward terminal as such is not employed in the net. The terminals 56(*i*—1) and 57(*i*—1) are connected to NAND gates 59*i* and 61*i* which have their output leads cross-coupled to the input leads of the opposite gate via leads 62*i* and 63*i* respectively.

The output signals of the gates 59*i* and 61*i* are also applied to a gate 64*i* having its output signal applied to a lead 66i which is connected to the feedback output terminal 58*i* and the other input leads of gates 59*i* and 61*i* so that each of the three gates 59*i*, 61*i* and 64*i* has its output lead cross-coupled to the input leads of the other two gates in such a manner as to form a three-way flip-flop. The lead 66*i* is also connected to the output lead of a gate 67*i* and to input leads of gates 68*i*, 69*i* and 71*i*. The gates 68*i* and 69*i* are the output gates of the apparatus. One of the inputs of gate 68*i* is connected to the output of gate 59*i* via lead 72*i*, whereas one of the inputs of gate 69*i* is connected to the output of gate 61*i* via lead 73*i*.

The gate 71*i* is cross-coupled with a further gate 74*i* to provide a flip-flop, cross-coupling being effected by lead 76*i* connected to the output of gate 74*i* and one of the inputs of gate 71*i* and another lead 77*i* connected between an input of gate 74*i* and the output of gate 71*i*. Feedback signals from the net *i*+1 are applied to a terminal 58(*i*+1) and to a second input connection to the gate 74*i* and via a lead 78*i* to a second input of gate 67*i*. The output lead 76*i* of gate 74*i* is also connected as an input lead to each of the gates 67*i*, 68*i* and 69*i*.

The information states for net *i* are defined with reference to the output leads 72*i*, 73*i* and 66*i* of the three-way flip-flop according to the following table:

| State | 72 | 73*i* | 66*i* |
|---|---|---|---|
| N | 1 | 1 | 0 |
| 0 | 1 | 1 | 1 |
| 1 | 0 | 1 | 1 |

Figure 3:
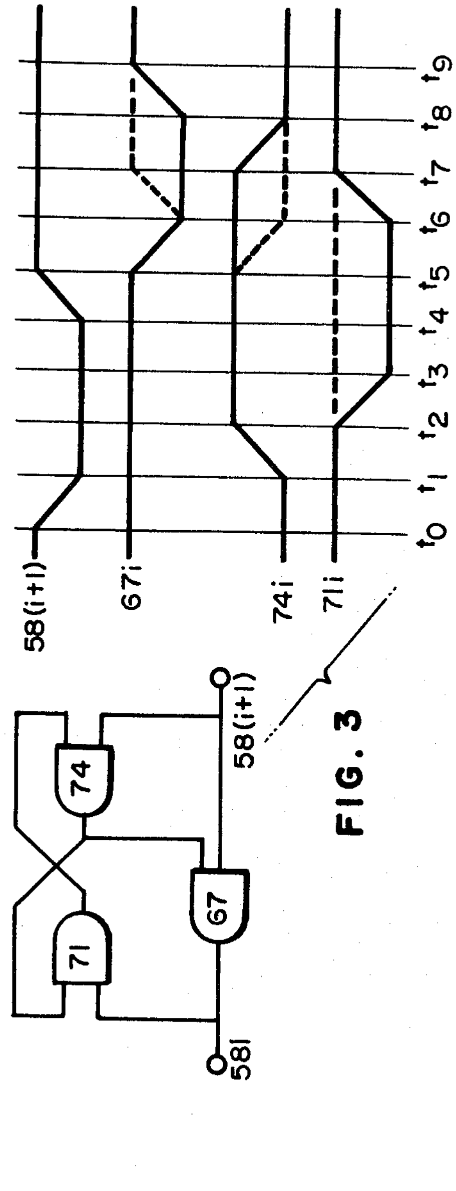
FIG. 3 is the logic block diagram of the control section of the circuit of FIG. 2 and the timing diagrams applicable thereto.

The operation of the apparatus of FIG. 3 is described by reference to Table I below, wherein the left column describes the condition of the net *i* at various periods during its operation and the designations of the top of the table, 66*i*, 77*i*, 76*i* and 78*i*, are columns indicating the condition of the signals on those particular leads during the operation of the net. Numerals 0 and 1 are underlined to indicate forcing signals, that is, controlling signals; the numerals 0 and 1 which are not underlined indicate conditions obtained in other parts of the circuit as a result of the forcing signals.

| State of NET *i* | 66*i* | 77*i* | 76*i* | 78*i* | State of NET *I*) - |
|---|---|---|---|---|---|
| N | 0 | 1 | 0 | 1 | I |
| I | 1 | 1 | 0 | 1 | I |
| I | 1 | 0 | 1 | 0 | N |
| I | 1 | 0 | 1 | 1 | I |
| N | 0 | 1 | 0 | 1 | I |
| N | 0 | 1 | 1 | 0 | N |

Initially it is assumed that 1's are applied to both of the input terminals 56(*i*—1) and 57(*i*—1) and a 0 is developed on the lead 66*i* and thus on the terminal 58*i*, indicating that the first stage is in a neutral state and is ready to receive information. It is assumed for purposes of this explanation that the net *i*+1 has stored information and therefore is in state I. Thus a 1 is applied to the terminal 58(*i*+1) and is developed on the lead 78*i*. The 1 signals applied to the leads 56(*i*—1) and 57(*i*—1) are cross-coupled to the two inputs of the gate 64*i* via leads 63*i* and 62*i* respectively, so that the gate 64*i* develops a 0 on the output lead 66*i*.

Under the above conditions 1's appear on both of the leads 72*i* and 73*i* while the O on the lead 66*i* (this signal overriding, as previously explained, the 1 from gate 67*i*) is applied to the gates 68*i* and 69*i*, thus preventing any transfer of information from net *i* to net *i*+1 and so that 1 signals appear at the terminals 56*i* and 57*i* indicating to the net *i*+1 that the first net *i* is in the neutral state. The above conditions are stable and are illustrated in line 1 of Table I.

If now one of the signals on the leads 56(*i*—1) or 57(*i*—1) is changed to a 0 to indicate a 0 or a 1 state (it being immaterial to subsequent explanation which signal appears), one of the input signals of gate 64*i* is a 0 and the lead 66i develops a 1 thereon. It is assumed that the net *i*+1 is still in the I state and therefore the signals on the leads 77*i* and 76i do not change, the 0 signal on lead 76*i* ensuring that the output signals 1 from the gates 67*i*, 68*i*, 69*i* and 71*i* remain 1's. The above condition is stable and is illustrated in line 2 of the Table I.

If now the signal on the lead 58(*i*+1) changes to a 0, the net *i*+1 is now in the N state and is ready to receive information, regardless of all else, the signal on the lead 66*i* remains a 1 due to the O input signal from the lead 78*i* and either lead 62*i* or 63*i*. The output signal from the gate 74*i*, however, changes to a 1 and is applied to the lead 76*i*, all as illustrated in line 3 of Table I. The gates 68*i* and 69*i* are now opened and transmit the information stored in the gates 59*i* and 61i to the output terminals 56*i* and 57*i*. Specifically, if a 0 had been applied to the lead 56(*i*—1) and a 1 had been applied to the lead 57(*i*—1) (a 0 information state), the lead 72*i* has a 1 developed thereon and the lead 73*i* has a 0 developed thereon. All of the input leads to the gate 68*i* now have 1's applied thereto so that the output terminal 56*i* has a 0 developed thereon. The lead 73*i*, having a 0 thereon, produces a 1 output signal from the gate 69*i* which appears on the lead 57*i*. Thus the information is transmitted to the net *i*+1 which at this point is in the same condition as the net *i* was at the beginning of this discussion, that is, in the neutral state with the signals on its various leads as indicated in the first line of Table I.

Having now received information the net *i*+1 develops a 1 signal on the terminal 58(*i*+1) (see line 4 of Table I). Specifically, since the signals applied to the gate 64(*i*+1) are now a 1 and a 0 the output lead 66(*i*+1) from this gate has a 1 developed thereon, and also, as will be clear later, the output of gate 67(*i*+1) is a 1. This condition is illustrated in the fourth line of the Table I and it is seen that the leads 76*i* and 78*i* both have 1's developed thereon. This condition causes the gate 67*i* to produce a 0 output and the fifth line, illustrated in Table I, is developed; that is, the output signal of the gate 67*i* becomes a 0 and the net i returns to the neutral state which, as indicated in the fifth line of the Table I, causes all elements to assume their original states as illustrated in the first line of the Table I. It will be noted that the transition from the states of line 4 to line 5 of the Table I is self cycling which will be discussed in greater detail relative to FIG. 4.

One further case should be considered; that is, where initially net *i* is in the neutral state N and net *i*+1 is in the I state and then net *i*+1 becomes neutral with net *i* remaining unchanged. This initial condition is illustrated in the fifth line and the final condition in the sixth line of Table I. When the state of net *i*+1 becomes neutral but there has been no change in the input information to net *i*, then the only change that occurs in net *i* is that the lead 76*i* becomes a 1. This is the flip-flop action of the control section previously referred to. This change, in effect, partially opens the gates 68*i* and 69i and makes no other changes in the net, since said gates are still held closed by the 0 on lead 66*i*. In consequence, as soon as information is applied to the terminals 56(*i*—1) and 57(*i*—1) and the output gate 64*i* becomes a 1, this information is also transmitted to net *i*+1. Other than as outlined above, the change of state of net *i*+1 has no effect on net i when the latter is in the neutral state. More importantly, no transmission of information from net *i* to net *i*+1 occurs at all when net *i* is in the N state, regardless of the state of net *i*+1.

Before proceeding to a discussion of interfacing of the nets of the invention with each other or more conventional circuits, consideration should be given to the internal timing of the nets since this factor must be considered when designing the timing required of the interfaces employed. The internal timing of the circuit of an individual net of FIG. 2 is equal to the transit time through six gates. Considering the time interval starting from the time the information is initially applied to the terminals 56(*i*—1) and 57(*i*—1), and assuming both net *i* and net *i*+1 to be in the neutral state, the internal timing is the sum of the time through the gates 64*i*, 68*i* (or 69*i*), 64(*i*+1), 67*i*, 71*i*, and 74*i*. However, transmission of information down a chain is even faster. Specifically, if it is assumed that a chain is open all the way down its length, that is, all the stages are in their neutral state, and information is applied at the terminals 56(*i*—1) and 57(*i*—1) of the first stage, then information is transmitted down the chain at the rate of two gate delays only. Specifically, the information on the terminals 56(*i*—1) and 57(*i*—1) immediately appears on leads 72*i* and 73*i*, and after the output of gate 64*i* becomes a 1, it is transmitted through gate 68*i* (or 69*i*) and it appears at the inputs of the stage *i*+1 after only these two gate delays. Thus only two gate delays per stage are involved in the actual transmission of a single bit of information down the chain. The resetting and elimination of previously stored information utilizes the other four gate intervals.

It is apparent that no serious races occur in the apparatus. In all instances, adequate time is provided for each function (each operation of a gate) to be completed before a gate is called upon to respond to a new signal, i.e. perform another function. For instance, when a valid bit of information (a 0 or a 1) is transferred from net *i* to net *i*+1, the latter assumes the proper stable state well before the feedback signal generated at the terminal 58(*i*+1) clears net *i* (sets net *i* to the N state) by means of gates 67*i* and 61*i* (or 59*i*) and removes the valid information from the input terminals of stage *i*+1 by means of gates 67*i* and 68*i* (or 69*i*). Also, stage *i* assumes the N state well before the "clear" action forced by a 0 output from gate 67*i* is terminated by the "one-shot" operation which ensures in the gate loop 67*i*-71*i*-74*i*-67*i* whenever the logic value of terminal 58(*i*+1) changes from a 0 to a 1. Specifically "races" are aliminated because the two signals applied to any gate transverse path having different numbers of gates.

Again, it should be emphasized that no information transfer from net *i* to net *i*+1 occurs when net *i* is in the N state, regardless of the stage of net *n*+1. As a matter of fact, a transfer operation is initiated only when net *i* is in the I state and net *i*+1 is in the N state. The transfer operation that ensues is such that, upon its termination, stage *i* has assumed the N state and stage *i*+1 has assumed the I state previously held by net *i*, that is, net *i* and net *i*+1 have exchanged their previously held states; IN → NI.

This pair-wise behavior is very important and is one of the most basic, distinguished and unique features of the present nets. When the chain is storing all N's, insertion of information in any stage causes the IN → NI function to traverse the entire chain downstream of the point of insertion of information.

There are several additional features of the apparatus of FIG. 2 and, more particularly, of the interrelationship of two or more nets that should be made completely clear and which are quite important to an understanding of the advantages of the system. It will be noted that information is gated out of a net *i* upon the appearance of an appropriate signal, a 0 at its terminal 58(*i*+1). If this particular net is the last net or stage in a string of stages, then application of a 0 to the terminal 58(*i*+1) of such last stage gates the information out of the chain, and a following application of 1 to the same terminal "pulls" new information from the preceding stage of the chain into such last stage. Thus the last stage of the net may be readily interfaced with a synchronous system since clock pulses from such a system may readily be applied to the terminal 58(*i*+1). The appearance of the neutral state at the last stage may be employed by the downstream synchronous circuits to indicate a lack of information.

At the other end of the chain of stages the same condition prevails, more particluarly, information may be inserted whenever the terminal 58*i* of that stage indicates that the stage is ready to accept information. Interface circuits are illustrated in subsequent drawings for the input of information to the chain, since certain other factors must be considered. However, from the point of view of timing, the only consideration is the fact that information may be inserted into the chain whenever a 0 signal appears on the terminal 58*i*. If the net of the present invention operates at a speed higher than that at which input information is presented, then, assuming that the input and output devices are themselves synchronous, the apparatus of the present invention will always accept the information at the rate at which it is presented.

Considering now the transfer of information between the stages and the timing involved, such transfer is completely internally controlled. Specifically, a first stage passes information to a second stage when the first stage has the information and the second stage indicates it is ready to accept such information. Ability of the second stage to accept information is a function of the stage downstream from the second stage having taken the information previously in the second stage and so on down the chain. Thus the internal operation of the apparatus is wholly asynchronous even though the apparatus is readily interfaced both at its input and output ends with synchronous devices which may be operating simultaneously with different phases and, for "short" time intervals, rates. The only constraint on the system is that the average output rate be equal to the average input rate of information. As far as instantaneous rates are concerned, the only requirement is that whenever the input rate temporarily exceeds the output rate, for any time interval, the excess of the input rate over the output rate should be equal to or smaller than the number of stages in the N state available in the chain. In the case that the output rate temporarily exceeds the input rate, no erroneous operation ensues if proper advantage is taken of the fact that the last stage of the chain will output only non-valid, N-state-type outputs after the information contained in the chain has been depleted. The apparatus of the present invention will appear as an elastic memory in any such system. Specifically, the apparatus accepts information up to its maximum storage capacity and transmits this information to an output device. Similarly, it accepts information at a rate which is well below its maximum storage capacity but appears to the output device exactly the same as it did when it was storing at its maximum capacity since input information proceeds immediately at a two gate delay per stage (a few nanoseconds) to the last stage of the chain or the last stage in state N. Thus the completely asynchronous operation of the apparatus causes the system to appear to expand and contract so far as the output device is concerned, as required by the quantity of information being transmitted. At the input end, the apparatus appears as an infinite memory.

Additional features of the apparatus of FIG. 2 which are discussed in detail below are that it may readily receive information in parallel or transmit it out in parallel and that fan-in and fan-out and loop operations are readily realized without any large complement of additional circuitry.

It is thus seen that the network arrangement of the present invention and the systems envisioned thereby far exceed the flexibility and capability of the systems of the prior art. The ease of interface, parallel read-in and read-out, of fan-in and fan-out and loop operations of the apparatus of FIG. 2, is believed to be readily apparent even at this stage of the writing, and will become increasingly apparent upon presentation of additional circuits.

As will become apparent subsequently, the circuit comprising essentially the gates 67, 71 and 74 has uses apart from the overall net and is employed to perform various functions in circuits of the present invention particularly involving interfacing with external circuits. Therefore, the operation of the circuit comprising these three gates is considered separately in the timing diagram of FIG. 3.

Referring specifically to FIG. 3, in addition to the schematic diagram the figure comprises four graphs, the uppermost graph indicating the voltage appearing at various time intervals on the terminal 58(*i*+1) of the first net of FIG. 2. The second graph indicates the voltage appearing on the output lead of the gate 67 and the third and fourth graphs indicate the voltages appearing in the output leads of the gates 74 and 71 respectively. These graphs take into account the time intervals required for any signal to change from one voltage level to the other. Such time intervals include the combined effects of triggering level, initial delay and response speed of each gate, and are shown to be the same for all gates and for both level changes. This is somewhat of an over-simplification, but it greatly eases understanding of the circuit operations, while still being sufficiently accurate for the present purposes. Reference to FIG. 3 indicates steady-state conditions existing prior to $t_0$, after $t_9$ and during the interval from $t_3$ to $t_4$. Transient conditions are shown to exist during the intervals from $t_0$ to $t_3$ and from $t_4$ to $t_9$.

The steady-steady situation existing during the interval from $t_3$ to $t_4$ is the easier one to describe. In this case, a 0 has been applied to terminal 58(*i*+1) for a sufficiently long time so as to cause the outputs of both gates 67 and 74 to assume 1 signals, and for these latter signals, in turn, to cause the output of gate 71 to become a 0, and thus for the circuit to assume steady-state conditions (namely, a situation such that input/output relations are satisfied for each of the NAND gates comprised by the circuit).

The steady-state situation existing prior to time $t_o$ (and after $t_9$) is somewhat harder to describe since the 1 signal applied to terminal 58(*i*+1) by itself is not sufficient to determine the output value of gates 67 and 74 and, in turn, of gate 71. Therefore, some assumptions must be made and their validity must be verified. First, the assumption is made that the output of gate 74 is a 1. Then, it follows that the output of gate 67 must be a 0 since both its input signals are 1. Gate 71, in turn, having a 0 on one of its input leads, must have a 1 output. Thus, both inputs of gate 74 and 1 and, therefore, its output must be a 0, but this is in contradiction with the assumption made that such an output be a 1. Next, the assumption is made that the output of gate 74 is a 0. Then, it follows that the output of both gates 71 and 67 must be 1. Thus, the inputs of gate 74 are both 1 and, therefore, its output must be a 0, and this agrees with the assumption made.

The following remarks regarding steady-state conditions of the circuit are worthy of notice. The first remark concerns the characteristics of the circuit itself and it points out two facts, one being that the output of gate 67 is always 1 regardless of whether the circuit input terminal 58(*i*+1) is a 0 or a 1, and the other fact being that the inputs of gate 74 have both the same value, i.e. they are both 0 or both 1. A second remark is about the uses that can be made of such a circuit. Reference to FIG. 3 shows that a 1 applied to terminal 58($i$+1) serves to indicate that the downstream net is not ready to accept information in the application of FIG. 3, or, in any other given system, that the downstream device, whatever its nature, does not wish information to be transmitted. In this case, the output of gate 74 is 0 and, in the operation of the nets of FIG. 2, is used to block transmission of information by the gates 68 and 69. The opposite situation occurs whenever a 0 is applied to the same terminal 58 (i+1), namely, in this case the downstream device wishes information to be transmitted, the output of gate 74 is a 1 and, in the application of the nets of FIG. 2, such output signal would permit transmission of information to take place. Of course, another condition must be satisfied for transmission to actually take place, e.g. in the application of the nets of FIG. 3, the upstream net must have valid information to transmit, i.e. it must not be in the N state.

The transient situations in the circuit are described next. With referecne to FIG. 3, starting at time $t_0$ and ending at time $t_1$ the voltage on the terminal 58($i$+1) goes to 0, indicating that a transfer function is to be effected. Thus, a 0 signal is applied to the input of the gate 74 and at the time $t_2$ the output voltage of the gate 74 goes to 1. In the circuit of FIG. 2, of course, the signal 1 appearing on the output of the gate 74 opens the gates 68 and 69. In addition, since the gate 57 has a 1 output signal and a 1 now appears on the output of the gate 74, the gate 71 now has two 1's applied to its input circuits and the output of the gate 71 falls to 0. This occurs at time $t_3$ and nothing further happens at this point. At some subsequent time, say starting at time $t_4$ and ending at time $t_5$the voltage on the terminal 58($i$+1) rises to 1. The 1 now appearing on the terminal 58 causes two 1's to be applied to the gate 67 which at time $t_6$ produces a 0 output voltage. The 0 output voltage from the gate 67 causes the gate 71 to produce a 1 signal on its output lead at time $t_7$. The 1 appearing on the output lead of the gate 71 causes the gate 74 to have a 1 applied to both input leads and thus its output lead falls to 0 at time $t_8$. When the output lead of the gate 74 falls to 0, a 0 is applied to an input lead at both of the gates 67 and 71. But since the gate 71 already has a 0 on the other input lead this fact has no effect on gate 71. However, the 0 now applied to the input lead of the gate 67 causes the gate 67 to produce a 1 at time $t_9$. This last signal has no effect on gate 71 since gate 71 has already a 0 on the other input lead. Thus no further changes in any of the gates comprised in the circuit can take place and initial conditions are reestablished.

Other signals may be applied in specific uses of the circuit, to other portions of the circuit subsystem comprising gates 67, 71 and 74 to cause operations to occur in a different sequence. Such uses of the circuit are found in various circuits subsequently illustrated and described. However, the essential operation of all of the circuits is as described relative to FIG. 3.

In conclusion, it is well to note the fact that as a result of the signal on lead 58($i$+1) changing from a 0 to a 1, the output of gate 67 changes from a 1 to a 0 and back again to a 1. Thus, a negative pulse, three gate delay times wide at the mid-points of its transactions, was generated in response to a simple voltage level change from a 0 to a 1 at the input terminal 58($i$+1) of the circuit. That is to say, the circuit displays a very valuable pulse-forming or one-shot type action in response to dc type signals. This fact is quite important in that it allows combinatorial type (or level, or dc-type) logic to perform memory-like functions without recourse to doubele-storage techniques (essentially use of two flipflops per information bit) as is common practice. Furthermore, in the application to the nets of FIG. 2, this memory-like function is accomplished within the scope of the feedback control signals (i.e. proper reception of information of the downstream net) and with ample margin of safety and yet within a remarkably short time interval.

Figure 4:
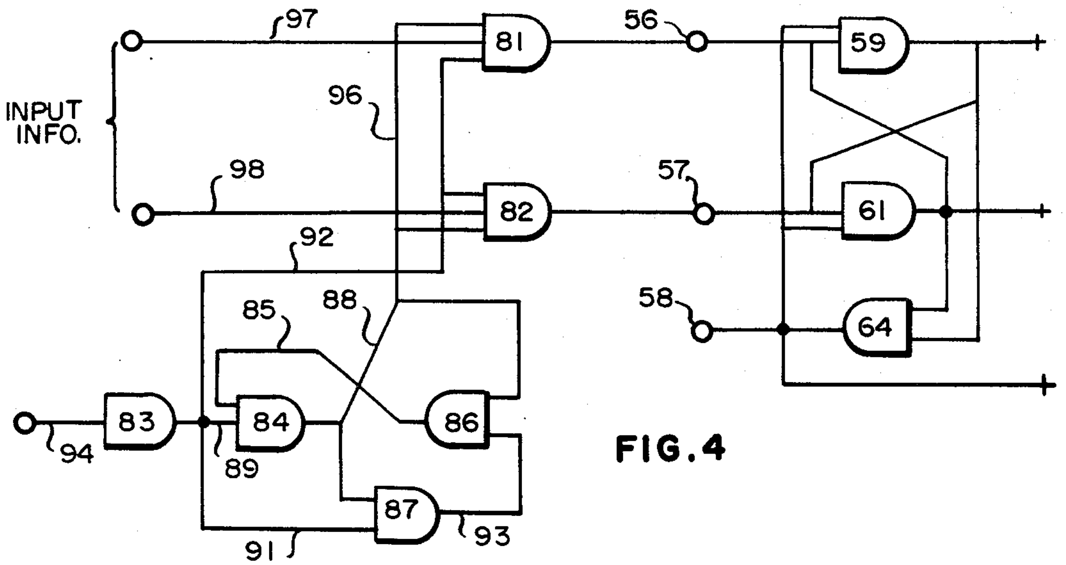
FIG. 4 is a logic block diagram of a circuit employed to serially interface the input circuit of FIG. 2 with external circuits.

Referring now specifically to FIG. 4 of the accompanying drawings, there is illustrated an input interface circuit for introducing serial information into a net of FIG. 2. There is one danger inherent in inserting information from a synchronous circuit into an asynchronous circuit and this basically is that there must be provided guarantees against transmitting the same information twice, or more specifically, transferring a given unit of information from the interface circuit into the asynchronous circuit as two or more distinct units of information. In consequence, constraints are placed on the length of time that the information is available to the asynchronous net. First of all, the information must subsist in the interface circuit for sufficient length of time to guarantee transfer of that information to the asynchronous net. This constraint is easily met since the nets of the present invention operate in a time which is several times shorter than that required by comparable conventional devices. Second, the information must be removed from the input leads to the asynchronous net after a sufficiently short period of time to ensure that the asynchronous net is not looking for a second piece of information while the first piece of information is still present in the interface circuit. This constraint is met using one of the several adaptations of the control circuit of FIG. 3 employed for interfacing, thus avoiding undue constraints on the external source.

Referring to FIG. 4, the portions of the net of the present invention which are illustrated in FIG. 4 bear the same reference numerals as they do in FIG. 2. In addition, there is illustrated a circuit which comprises initially a pair of gates 81 and 82 employed to control transmission of information from an external circuit to the input gates 59 and 61 of the first stage of the chain of nets of the present invention. Control of passage of information through the gates 81 and 82 is effected by a series of four gates 83, 84, 86 and 87, the latter three gates corresponding to gates 74, 71 and 67 of FIG. 3. The gates 84 and 86 are cross-coupled via leads 85 and 88. A second input lead to the gate 84 is connected via lead 89 to the output circuit of the gate 83. The output circuit of the gate 83 is also connected via leads 91 and 92 to input circuits to the gate 87 and the gates 81 and 82. The output lead 88 of the gate 84 is also connected to an input of the gate 87, while an output lead 93 from the gate 87 is connected as a second input lead to the gate 86. A lead 96 also connects the output of gate 84 to input circuits of gates 81 and 82.

Figure 6:
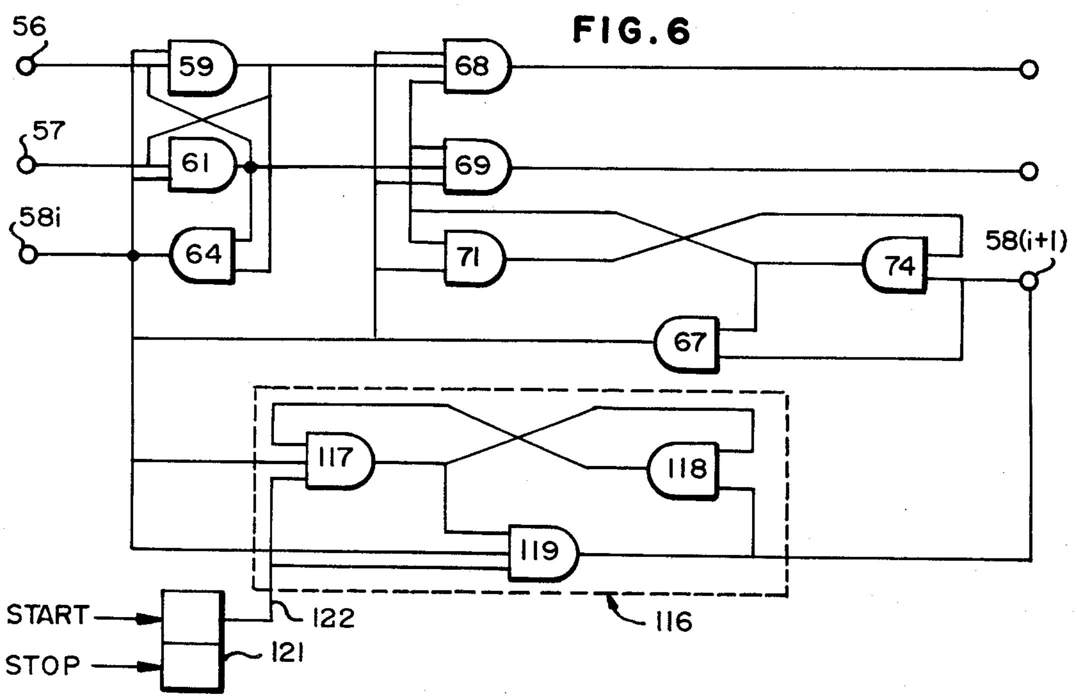
FIG. 6 is a logic block diagram of a serial output interface circuit.

The operation of this circuit is probably best understood by reference to the timing diagrams of FIG. 6 and considering similarities with the circuit and timing diagrams of FIG. 3. The graph designated by numeral 94 refers to the input control signal appearing on input lead 94 to the gate 83. The timing diagrams relative to each of the gates indicates the response at the output lead of the gate with several factors taken into account as a simple delay through the gates in a manner similar to that used for FIG. 3. It is assumed that the delay of operation of the various gates in this interface network are the same on the average as the delay in the operation of the gates in the nets of the present invention, the gates all being NAND gates and of the same construction.

Initially the lead 94 has a 1 signal applied thereto from the external information source, indicating that the source has no information to transmit to the nets of the present invention. The output lead from the gate 83 thus has a O thereon and the gates 81 and 82 are thus constrained to have 1's developed on their output leads and thus a neutral state is generated at the output of the interface. Since 0's are applied at the input leads to both of gates 84 and 87, they generate 1's at their outputs. Thus the gate 86 has a 1 applied to both of its input leads and produces a 0 at its output circuit as illustrated in the graph of FIG. 5.

The system has now received input information which it is wished to gate to the following net. The information appears at the input leads 97 and 98 of gates 81 and 82, as two opposite voltage values, i.e. one of them being a 0 and the other being a 1. A 0 appears on lead 97 of gate 81 when the information has value 1; a 0 appears on lead 98 of gate 82 when the information has value 0. The control signal on the lead 94 is then changed to a zero indicating that the external circuit is ready to transfer information to the net of the present invention. This situation is indicated by the negative going part of line 94 of the graph of FIG. 5. After an appropriate time delay which is a function of the gate 83, the voltage on its output lead rises to a 1. This 1 level appears on the lead 92 while lead 96 also has a 1 level since the output of gate 84 is also kept at the 1 level by the 0 output of gate 86. Thus the gates 81 and 82 are opened and produce on their output terminals 56 and 57 information corresponding to that applied to the input terminals by the source. Specifically assuming the information to be a 1, the gate 81 has a 0 applied to its input terminal 97 and therefore its output signal is a 1. The gate 82 has a 1 applied to its input terminal 98 and this, in conjunction with the 1's appearong on the leads 92 and 96, produces a 0 at its output terminal 57 which is indicated in FIG. 6 by the negative going wave of the line indicated by the numeral 82. Thus the information which appears at the input terminals to the gates 81 and 82 is gated to the gates 59 and 61 of the input net of the apparatus of the present invention.

Figure 5:
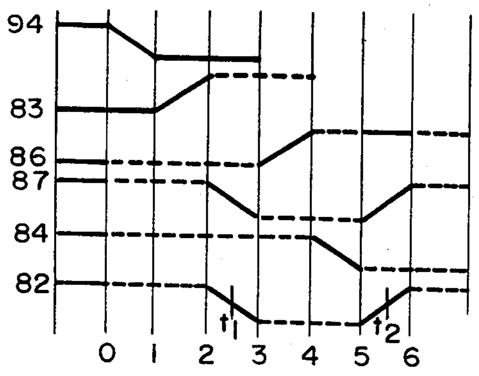
FIG. 5 is a timing diagram of the circuit of FIG. 4.

As it has been shown previously for the timing of FIG. 3, with reference to FIG. 5, after the output of gate 83 has assumed its 1 level, the following sequence of events occur: the output of gate 87 becomes a 0, the output of gate 86 becomes a 1, the output of gate 84 becomes a 0, the output of gate 87 becomes a 1 again. At the time when the output of gate 84 becomes a 0 gates 81 and 82 are closed and thus any further flow of information to the nets of the present invention is stopped.

At a later time the gate signal appearing on lead 94 returns to its 1 state and all of the gates assume the condition illustrated at the beginning of the graphs of FIG. 5.

As previously indicated, in considering the performance of any circuit relative to feeding the nets of the present invention, the input information must be applied to the net for a sufficient length of time to ensure that the net acquires the information but must be terminated sufficiently quickly so that the net does not acquire the information twice under any set of operating circumstances. Also, as previously indicated, it takes a net of the present invention about two gate intervals to reliably acquire new information and it takes six gate intervals for information to be acquired and transmitted by a net and for the net to be reset to the N state, which is the condition to again accept new information.

Referring to the timing diagrams of FIG. 5, it can be seen that, assuming a gate acquires information when its signal has reached its half switching point, the information is gated through the gate 82 at a time designated on the graph by $t_1$ and subsists for an interval ending at time $t_2$. If the speed of operation of the gates 84, 86 and 87 is substantially the same as the gates 59 and 61, then it is apparent that the signal is applied to these latter gates for an interval equal to three gate intervals. The total time from the appearance to the termination of a signal is therefore well within the required margin of safety. A "safer" circuit, using feedback from the first net of the present invention, terminal 58, to the control gates 84, 86 and 87, will be shown later.

It should be noted that the gate 83 serves only a single function in the diagram of FIG. 4. Specifically it converts the negative input control signal on the lead 94 to a positive signal. Thus, if the input control signal is a positive going signal, gate 83 may be eliminated and then the total delay required to transfer the input information into the first net is reduced by one gate switching time.

The above description of the input circuit of FIG. 4 indicates that the circuit is useful particularly when information from the apparatus feeding the net of the invention becomes available prior to or no later than one gate delay after the appearance of a negative going control signal. However, it may be that the control signal occurs prior to the arrival of new information. In this case, several gate pairs may be added in cascade in front of gate 83 in order to obtain the required delay, so that gates 81 and 82 are not open before the information is available at the input leads 97 and 98. If, in addition to occurring prior to the information arrival, the control signal is also positive-going, then an odd number of gates must be used in front of gate 83. As it was noted earlier, in regard to the function of gate 83, these additional gates do not change the length of the time interval during which information is gated into the net of the present invention.

As another alternate, an inverting gate may be inserted directly between the lead 93 and the input circuits of the gates 81 and 82 with this lead constituting now the only input to these gates in addition to the information leads. In this instance, the delay or gate delays introduced between the appearance of the pulse on lead 94 and the gating of a signal through the gates 81 and 82 is three gate intervals, the gate 83, the added gate just discussed and the gate 87. Duration of the gating interval remains unchanged as three gate delay times.

The above description makes it apparent that although a single standard type of input circuit may not be employed, the basic control network (gates 84, 86 and 87) is the same and additional control elements or gates may be introduced to produce the proper timing or provide the proper timing interface between the external and internal circuitry.

Referring now specifically to FIG. 6 of the accompanying drawings, there is illustrated a circuit employed to gate information out of the net of the present invention. The elements of the net bear the same reference numerals as employed in various of the previous figures, and the apparatus again employs as an interface subcircuit the basic control section of a net which in FIG. 6 is generally designated by the reference numeral 116. The output interface control circuit 116 employs gates 117, 118 and 119 having the output and input circuits of the gates 117 and 118 cross-coupled and with the output circuit of the gate 117 connected to provide an input signal to the gate 119. The output signal from the gate 119 is supplied to the terminal 58(*i*+1) and as an input signal to the gate 118. Both of the gates 117 and 119 receive an input signal from the terminal 58*i*. Additional input signals to the gates 117 and 119 are derived from a flip-flop 121 which develops the transfer or no transfer signal on a lead 122 connected as input to the aforesaid gates 117 and 119. "Start" and "Stop" transfer signals are applied to the flip-flop 121 in order to control start or stop of transfer information from the net to an external circuit which may be, for instance, a shift register.

It is the function of the control circuit 116 as was the function of the similar control circuits in the input interfaces to the nets of the invention to ensure that sufficient time is effected for transfer while insufficient time is allowed during the transfer function to permit transfer of the same unit of information twice. It will become apparent that the interfacing of the output is simpler than the interfacing of the input since once a start or transfer signal is developed on the lead 122, information is transferred at a rate determined by the net until the transfer signal is removed from the lead 122.

Figure 7:
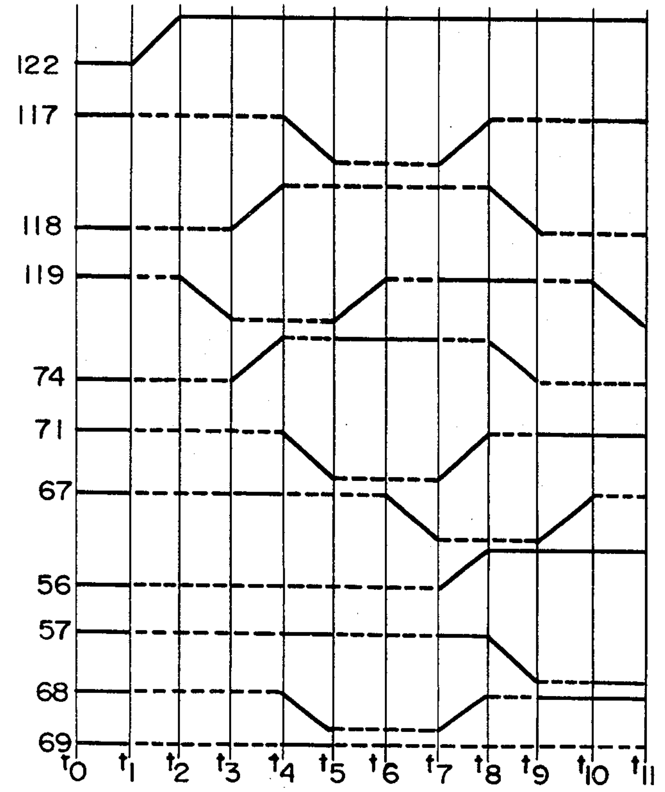
FIG. 7 is the timing diagram illustrating the operation of the circuit of FIG. 6.

Referring now specifically to FIG. 7 of the accompanying drawings, there is illustrated a graph defining the operation of each element in the control circuit 116 and each of the gates of the net. Where the graph refers to a particular gate, the function defined is the output function of the gate. It is assumed for purposes of example only, that the terminal 56 has a 0 applied thereto while the terminal 57 has a 1 applied thereto. Initially ($t_0$) the lead 122 has a O signal thereon which indicates no transfer is to occur. Upon the application of a start pulse ($t_1$) to the flip-flop 121, a 1 signal ($t_2$) is developed on the lead 122 and is applied directly to the gates 119 and 117. The gate 117 is initially unaffected since a 0 is applied thereto from the gate 118 and its output signal remains a 1. However, the gate 119 is affected and switches ($t_2 - t_3$) from a 1 state to a 0 state. Switching of the gate 119 to the 0 state causes the gate 118 to switch ($t_3$ –0 $t_4$) to the 1 state and apply a 1 to the gate 117 which since it has 1's applied to the other input leads now switched ($t_4 - t_5$) to a 0 state. Switching of the gate 117 to the 0 state causes the gate 119 to switch ($t_5 - t_6$) back to its 1 state. It should be noted that the interval during which the gate 119 was in its 0 state is equal to three gate delays ($t_{2-3} - t_{5-6}$).

It is well to determine the effect of the above operations within the control circuit 116 upon the net.

When the gate 119 went from its 1 to its 0 state, the gate 74 which previously had 1's applied to both of its input leads has a 0 applied to its input from the gate 119 and thus the gate 74 develops ($t_4$) a positive signal on its output lead. The lead 66 previously had a 1 signal thereon and thus two 1 signals are applied to the gate 71 which now produces ($t_5$) a 0 signal on its output lead which is reapplied to gate 74 thus holding its output to the level 1. The 1 signal developed on the output lead of the gate 74 constitutes gating signals for the gates 68 and 69 and the information developed at the output leads of the gates 59 and 61 is gated to the output information leads of the net ($t_5$).

Upon resetting of the gate 119 ($t_6$), the gate 67 has 1's applied to both of its input leads and develops a 0 ($t_7$) on its output lead. A 0 signal on the lead 66 and terminal 58i switches the gate 117 ($t_8$) which in turn switches the gate 118 ($t_9$). The 0 signal on the lead 66 reset the gates 59 and 61 to 1 and they are now free to acquire ($t_8 - t_9$) a new unit of information, which in this case is assumed to be 1 and 0, the converse of the original signals. Switching of the gate 67 ($t_6 - t_7$) from 1 to 0, caused the gate 71 to switch ($t_7 - t_8$) from a 0 to a 1 which in turn forces the gate 74 to switch ($t_8 - t_9$) from a 1 to a 0. Switching of the gate 74 from 1 to 0 causes the gate 67 to now switch back ($t_9 - t_{10}$) from 0 to 1 and thus the gate 119 now has all 1's applied to its input circuits and switches back ($t_{10} - t_{11}$) to a 0 to start the shift out cycle all over again.

Thus it is seen that the system of FIG. 6 is self-timing. As long as a shift out signal or a 1 appears on the lead 122 the interrelationship of the control circuit of the net and the control circuit 116 is such that the apparatus continues to self-cycle.

It will be noted that in the circuit of FIG. 6 there are five gate delays ($t_{5-6} - t_{10-11}$) between the end of one shift out operation and the beginning of the next shift out. The total delay of the circuit of FIG. 6 between initiation of shift outs is eight gate delays as opposed to the six gate delays normally encountered in the nets both through the net itself and with some of the input interface circuits described.

Thus far there has been discussed the concept of serial feed-in and serial feed-out of the net. However, parallel feed-in and parallel feed-out are important concepts in any information handling system and the nets are now considered from the point of view of these latter functions. It should be kept in mind that parallel operation in one mode (feed-in or feed-out) must not interfere with the serial mode of operation, (serial feed-out and serial feed-in respectively).

Figure 8:
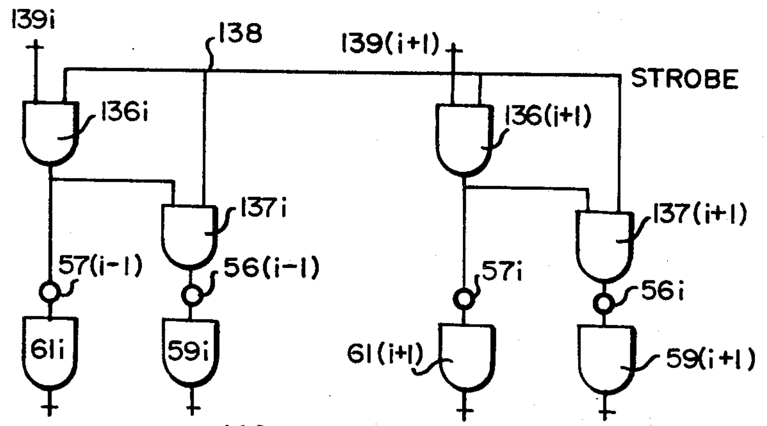
FIG. 8 is a logic block diagram of a parallel input interface circuit.

The parallel feed of information into a series of nets of the type of the present invention is quite simple and requires practically no additional circuitry. Initially reference is made to FIG. 2 to consider what can happen when information is fed in parallel to the circuits of FIG. 2. First of all, valid information (0 or 1), as will become apparent subsequently upon reference to FIG. 8, is fed to all nets by means of the terminals 56 and 57 thus possibly producing a change in information appearing on leads 72 and 73. This latter change may produce a change in the signals (0 to 1) on the leads 66 if any of the nets were in the N state at a prior time. The question of greatest concern is what happens when the leads 66 switch to 1's since this switching action affects prior circuits in the string of nets. Actually, only three different conditions may arise. In any given string of nets, with reference to net $i$, the terminal 58($i$+1) can become positive first, the terminal 58$i$ can become positive first or the terminals can become positive at the same time. The starting condition of the system is as illustrated at $t_3$ in FIG. 3. Both terminals 58$i$ and 58($i$+1) are 0 and the output leads of the gates 67, 74 and 71 are 1's. It will be noted that the output of the gate 71 at this instant is illustrated as a dashed line in FIG. 3. The discussion of FIG. 3 (the solid line graph) was for the generalized case of the control circuit. However, when the circuit is employed in a net as in FIG. 2 and the net in its neutral state, a 0 is generated by the gate 64 and thus the lead 66$i$ is 0 instead of a 1 even though the output signal of the gate 67 as determined by the input signals thereto would be a 1. The 0 on the input to the gate 71 produces a 1 on its output lead, but this effects no change in any other gate, since the gate 74 has a 0 applied thereto by the terminal 58($i$+1) and thus the output signal from the gate 74 remains a 1. Whether or not the gate 64 produces a 0 or 1 output, the conditions in the control net are assumed as illustrated at $t_3$ in FIG. 3.

It is now assumed that the gate 64($i$+1), terminal 58($i$+1), switches to a 1 first and this occurs between the times $t_4$ and $t_5$ of FIG. 3. When 58($i$+1) goes to 1, the output of both gates 67 and 74 (dashed lines) go to 0. Gate 67 immediately reverts to the 1 state (dashed line) and the circuit is quiescent even when information is received by net $i$ since the output of gate 74 is 0 and thus switching can occur only when terminal 58($i$+1) goes to 0 indicating net ($i$+1) can accept information from net $i$, and therefore no malfunction has been generated in this case.

If net $i$ receives information first, the output of gate 71 shifts to a 0 and no further change occurs in the net since gate 74 already has a zero applied thereto from terminal 58($i$+1).

A possible complication now arises when terminal 58($i$+1) goes to 1, since a negative pulse is generated at the output of gate 67 and this pulse attempts to set net $i$ to the N state and thus erase the valid information stored therein. It is easily seen that in this case, if the appropriate terminal 56($i$−1) or 57($i$−1) is held at the 0 level until after said negative pulse terminates, the effects of the pulse upon net $i$ will be over-ridden and the net will end up in the proper state. This is to say that the 0 level should be held at the appropriate terminals 56 and 57 for not less than seven gate delay times.

In the case where both 64$i$ and 64($i$+1) change states at the same instant, since the control circuit comprising the gates 67, 71 and 74, have a positive feedback or self-reinforcing effect, the final status of the circuit cannot be an oscillation but must be the assumption of one or the other stable states indicated relative to the two prior conditions. Since these states eventually generate the same final condition, as it has been shown earlier, no difficulties arise relative to the final outcome of the system.

A circuit for suitably inserting information in parallel to the net of FIG. 2 is illustrated in FIG. 8.

referring specifically to FIG. 8, the circuitry for loading two successive nets is illustrated. The circuit for loading a single net comprises NAND gates 136$i$ and 137$i$. Each gate receives a 1 input from a strobe line 138. The gate 136 receives, over a lead 139$i$, the actual input information from the external circuits. The output lead of the gate 136$i$ is connected as an input lead to the gate 137$i$ and also supplies the gate 61$i$ via the terminal 57($i$−1). The output lead of the gate 137$i$ supplies the gate 59i via the terminal 56($i$−1).

Under initial conditions the strobe line 138 has a 0 applied thereto and therefore a 0 is applied to all gates. Thus the gates 136$i$ and 137$i$ both produce 1's at their output leads and impose 1's on the gates 59$i$ and 61$i$. When it is desired to gate information into the circuit a 1 is applied to the strobe line. If the lead 139$i$ has a 1 applied thereto, then two 1's are applied to the gate 136$i$ and its output signal is a 0. The 0 output signal from the gate 136$i$ is supplied to the gate 61$i$ and is concurrently applied to the gate 139$i$ thus forcing a 1 to be applied to the gate 59$i$. Conversely, if the lead 139$i$ has a 0 applied thereto, its output signal is a 1, applying a 1 to the gate 61$i$ and causing the gate 137$i$ to apply a 0 to the gate 59$i$. The strobe line in its 0 condition forces a neutral signal on the gates and when the strobe signal is a 1, a signal 0–1 or 1–0 is applied to the gates 59$i$ and 61$i$, respectively, depending upon the condition 0 or 1 of the lead 139$i$. Thus by simply applying signals in parallel to gates 139$i$ through 139($i$+N) the information may be gated in parallel to a chain of nets of the type illustrated in FIG. 2.

Previous discussions relative to the control circuit and the timing diagram of FIG. 3 indicate that no interference is to be anticipated as a result of parallel loading of the nets. The duration of the strobe pulse should be long enough to ensure that transient condition generated by possible negative pulses occurring at the gates 67 have terminated and the information has been stored in each net. Thus, this duration should be at least seven gate delays long.

Although the prceding discussion has been concerned with parallel loading of valid information into a series of nets, the same procedure can be used to set any of the nets into the N state. In this case, a 0 signal should be applied to terminal 58$i$ when it is desired to set net i to the N state. Duration of the 0 signal can be as short as three gate delays. Also, setting of net $i$ to the N state has no effect on the adjacent nets, but it should be noticed that, once the input signal to lead 58$i$ changes from a 0 to a 1, net is ready to receive whatever valid information is stored in net $i$−1 and therefore net i will not remain in the N state if net $i$+1 is in the I state.

Figure 9:
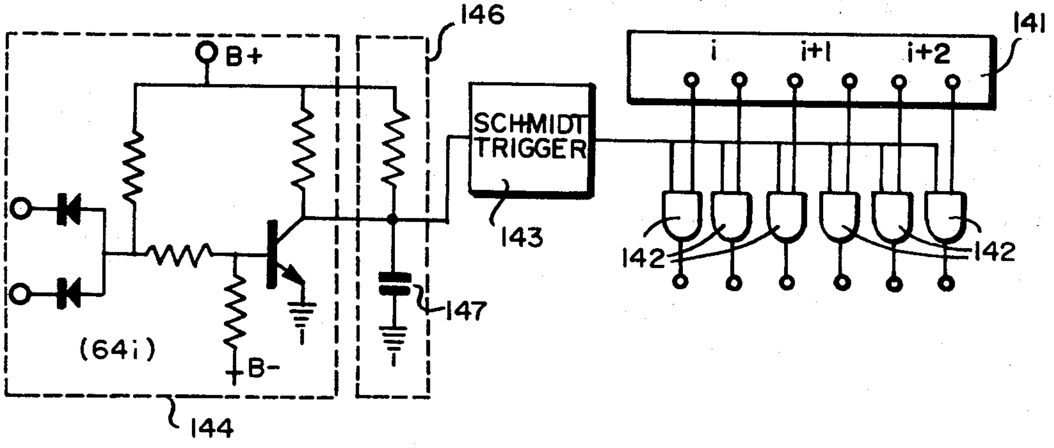
FIG. 9 illustrates a logic block diagram of a parallel read-out interface circuit.

In any system of the type of which the present invention is concerned, parallel feed-in of a register is normally employed when it is desired to change from parallel to serial operation. Conversely, parallel read-out of a register is normally employed when it is wished to switch from serial to parallel operation. The parallel read-out of information from a net or chain of nets of the invention is completely conventional. Determining when a chain of nets is full and therefore parallel read-out may be initiated, does present something of a problem since the nets of the present invention are asynchronous, and conventional techniques do not readily lend themselves to use with such circuits. One solution to the problem would be to calculate the maximum time required under any normal circumstances to fill the chain and introduce a time delay between parallel feed-outs which is greater than this known time interval. A simpler system which in effect counts the number of bits of information which have proceeded down a chain, can be employed. Such a system is illustrated in FIG. 9 of the accompanying drawings. In the circuit of FIG. 9, a plurality of nets, which are designated by the reference numeral 141 and which are arranged as illustrated in FIg. 2, have their output terminals 56 and 57 connected to gates generally designated by the reference numeral 142 which receive strobe pulses from a Schmidt trigger 143. A NAND gate 144 supplies pulses to an integrator circuit, generally designated by the reference numeral 146, including a capacitor 147. The NAND gate 144 is one of the gates 64 of the nets 141. For instance, in FIG. 9, there is illustrated three nets and it is assumed that the left-hand-most net, net *i*, is the first stage of the chain and therefore the last net to receive stable information. In this system the gate 144 would be the gate 64 of the stage *i*. If, on the other end, one were only interested in the last two units of information stored, that is, information in the righthand two nets, then the gate 64 of the net (*i*+1) would be sensed.

The operation of the circuit of FIG. 9 is as follows: Initially all nets are assumed to be in the neutral state and thus 1's are applied to both of the diodes of the NAND gate 144. The current flow through the diodes is blocked, the transistor of gate 144 becomes conductive and the voltage applied to the upper plate of the capacitor 147 is held at about ground potential. When the first unit of information is gated into the input stage of the nets 141, one of the diodes of gate 144 becomes conductive, the transistor becomes non-conductive, the output voltage of the gate 144 rises and the capacitor 147 begins to charge. However, very quickly, the information is passed on to the next net (*i*+1) and the stage *i* is reset to its neutral state and the capacitor is discharged. This cycle continues until all of the nets in the circuit 141 are filled, at which time the gate **64*i* does not again assume a neutral state until after the parallel feed-out of information. Thus the capacitor 147 continues to charge until it approaches the 1 output level of voltage of the NAND gate 144. If the threshold of the Schmidt trigger is set immediately below the high output voltage of the NAND gate 64*i*, that is, just below a voltage for the system, then the trigger fires only after some interval as determined by the value of the resistor and capacitor, in the intergrating network 146. Of course when the Schmidt trigger fires the information in the nets of the circuit 141 is read-out in parallel through the gates 142. By appropriately choosing the relative values of the resistor and capacitor in the intergrator network 146,** one can readily assume the fact that all of the nets have settled down and are in a steady state condition before parallel read-out, that is, before firing of the Schmidt trigger. The firing of the Schmidt trigger may additionally or as a completely independent function, operate a visual or audible indicator whereby to indicate that the register is full. This feature may be of particular value in read-out to peripheral equipment or in signalling in communication terminals.

There are times when it is necessary, particularly in an operation of two series of nets in parallel, to ensure that the information is transferred between, for instance, the next to the last and the last nets in synchronism, or more particularly, to ensure that the last two nets of two parallel strings both have information before, for instance, a read-out operation is permitted. Such an arrangement might be of interest in an adder where the information in the two strings of nets constitute the two binary words to be added. In a situation such as this, as indicated above, it is essential that both of the last stages of the cascaded nets or strings of nets have information and that information is not transferred out of a net which has information before the corresponding stage of the parallel string of nets has also received its information.

Figure 10:
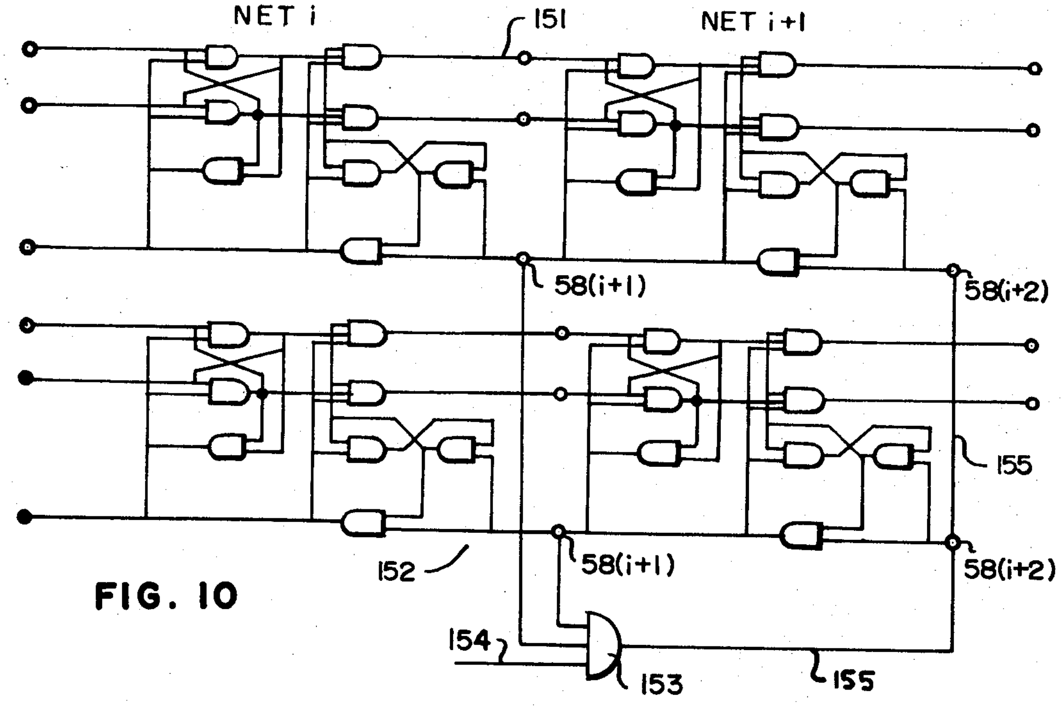
FIG. 10 is a logic block diagram of a circuit employed to control concurrent transfer of information between two adjacent nets in each of at least two parallel cascade chains of circuits.

Referring specifically to FIG. 10, there is illustrated a mechanism by which the above desired function may be accomplished. Specifically, it is assumed that two series of nets are connected or arranged in parallel, the upper series being designated by the reference numeral 151 and the lower series being designated by the reference numeral 152. Only the upper net **151(*i*+1) is illustrated in detail, since the last two net arrangements are identical. It will be noted that the illustration of the upper net is identical with that illustrated in FIG. 2 except that the terminal 58(*i*+1) is also connected as one input lead to a NAND gate 153. A second input lead to NAND gate 153 is derived from the terminal 58(*i*+1) of the last stage of the lower string of nets 152. A third input to gate 153 is lead 154** derived from the external systems involved with the read-out of information from the nets *i*+1. The output of gate 153 is connected to terminals **78(*i*+1)** of nets *i*+1 via lead 155.

Operation of the apparatus of FIG. 10 is as follows. Initially, it is assumed that no valid information is stored in either of nets *i*+1, i.e. both nets are in the N state and both terminals **58(*i*+1) are 0's. Then, as long as any of the inputs to gate 153 is a 0,** namely any of the nets *i*+1 does not have valid information or the external system does not wish information to be transferred, the output of gate 153 is a 1 and the output gates **68(*i*+1) and 69(*i*+1)** of both nets (*i*+1) are closed by the 0 signal applied at their inputs by gate **74(*i*+1) of the control circuit, as was demonstrated in reference to FIG. 3. As soon as all three inputs to gate 153 become 1's, the output of gate 153 becomes a 0, output gates 68(*i*+1) and 69(*i*+1)** are opened, thus allowing transfer of information from the nets *i*+1 to the external system. It should be noticed that, as long as all the inputs to gate 153 are 1's, the same unit of information will be continuously stored by each of the nets *i*+1 and made available at the outputs of gates **68(*i*+1) and 69(*i*+1). If now the input lead 154 to gate 153 from the external system goes to 0, indicating that the system does not wish information to be transferred, but indicating in this particular instant to have properly received previous information, the output of gate 153 goes to 1 and this causes negative pulses to appear at the output of gates 67(*i*+1)** of the control circuit, so that both nets *i*+1 are set to the N state and a new cycle can be started again. It is seen that no malfunctioning can occur during any of the subintervals of the operation cycle described and that the only requirements on the external signal is that the duration for each of the 0 or 1 states be at least three gate delay times.

It is apparent that the above operation may be performed with any number of string of nets, the number certainly not being limited to two as illustrated. All that is required for the case of n strings of nets is that gate 153 receive an input signal from the terminal **58(*i*+1) of each string (in addition to the external input lead 154) and that the output lead 155 from gate 153 be connected to lead 78(*i*+1)** of each string.

Figure 11:
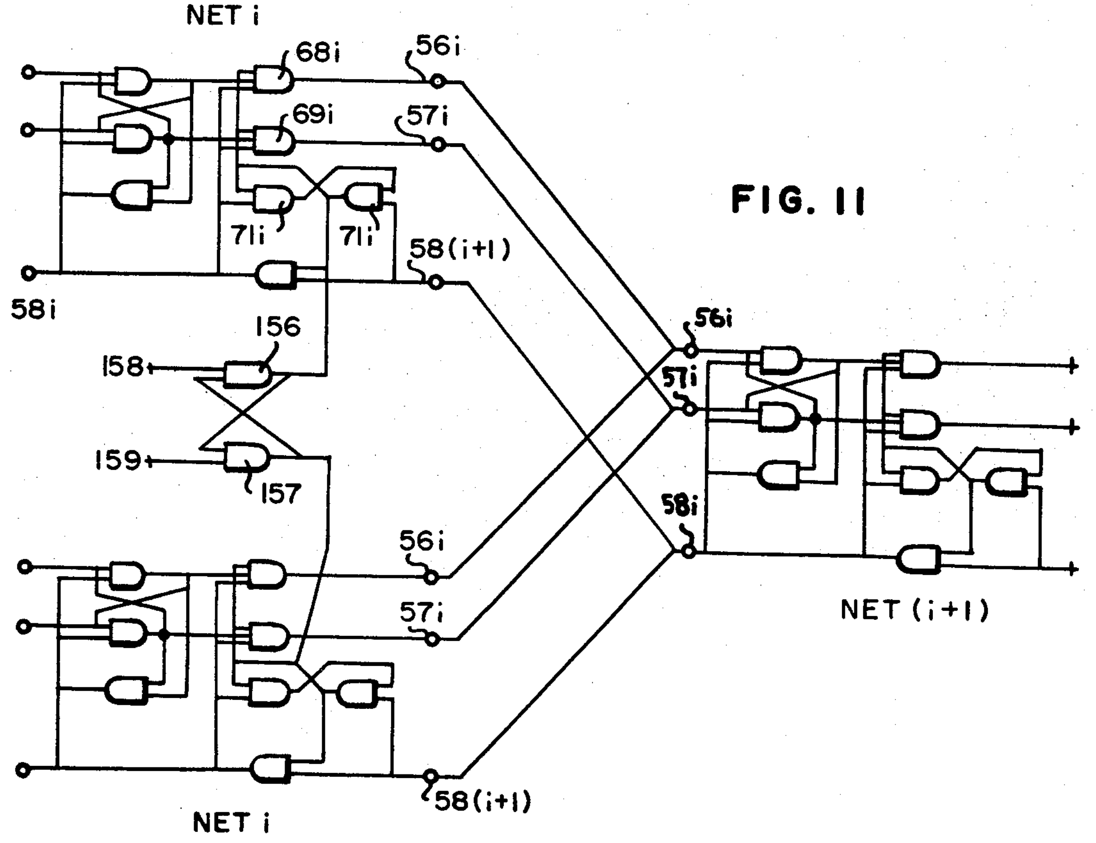
FIG. 11 is a logic block diagram of a multiplexer employing the circuit of the present invention.

In some applications it may be desired that information be fed to a string of nets from either of two other strings, (fan-in) as directed by some external control signal. FIG. 11 shows how this problem can be solved. The figure shows the last stages, nets *i*, of such two feeder strings and the first stage, net *i*+1, of the receiving string. A flip-flop formed by cross-coupled NAND gates 156 and 157 receives the external signals controlling which of the two string, i.e. the top or the bottom one, should feed information to net *i*+1. These external control signals are applied to the input of gate 156 via lead 158 and to the input of gate 157 via lead 159. The output of gate 156 is also connected to the output of gate 74*a* of the top net *i*, and the output of gate 157 is also connected to the output of gate 74*i* of the botton net *i*. Leads 56*i*, 57*i* and 58(*i*+1) of each net are connected with the like-named leads of the other two nets. Operation of this apparatus is as follows: Assume that the top string and not the botton one should feed information to net *i*+1. Then a 0 signal is applied from the external control circuitry to the input lead 158 of gate 156 (and a 1 to the input lead 159 of gate 157) thus causing the output of gate 156 to become a 1 and the output of gate 157 to become a 0. It is easily seen that the operation of the top net *i* remains unaltered, i.e. the apparatus behaves as if the top net *i* were connected directly to net *i*+1 and the bottom string and the flip-flop were not present at all. As far as the bottom net *i* is connected, the 0 applied to the output of its gate 74*i* effectively removes the bottom string from the rest of the apparatus since its gates 68*i* and 69*i* are closed and any feedback signals from terminal 58(*i*+1) cannot have any effect on its control section, i.e. the gates 67*i*, 74*i* and 71*i*.

If information had been desired from the bottom net i, then a 0 signal would have been applied to the input lead 159 of gate 157 (and a 1 to the input lead 158 of gate 156) thus causing a 1 at the output of gate 157 and a 0 at the output of gate 156. In this case, it is easily seen that transmission is inhibited from the top net i and is allowed from the bottom net *i*.

An important remark regarding the apparatus of FIG. 11 is that the maximum transmission rate is not affected by the presence of the switches 156–157. Also, transfer of information upstream of nets *i* is not directly affected by the presence of the switch, namely both strings of nets continue to receive and transmit information as long as valid information and storage (i.e. nets in the N state) are available.

It is apparent that the above operation can be performed with any number of feeder strings, the number certainly not being limited to two as illustrated. All that would be required, in the case of n feeder strings, is that the terminals 56*i*, 57*i* and 58(*i*+1) of net *i*+1 be connected to the like-named terminals of the last stage i of each string and that the flip-flop formed by the cross-coupled gates 156 and 157 be replaced by suitable circuitry. In particular cases, embodiment of such circuitry can take the form of a ring counter with a decoding matrix, consisting of "trigger" type flip-flops, and gates. This embodiment is well known and therefore will not be described here in detail. It will suffice, for the present purpose, to state that such circuitry can be thought of as a device with a single input lead and n-output leads all of which have a 0 signal applied thereto with the exception of one lead corresponding to the accumulated count, which has a 1 signal applied thereto. In the present application, each of the n outputs would be connected to the output lead of gate 74*i* of one of the feeder strings. The function of the ring counter and associated decoding matrix is to respond to an input pulse by increasing the accumulated count by one and thus change from a 1 to a 0 the signal on the output lead corresponding to the previous count and from a 0 to 1 the signal on the output lead corresponding to the new count. Succeeding pulses increase the count up to the maximum value n, at which point a new counting cycle is started. With the above additions, the apparatus of FIG. 11 can be very useful in solving "multiplexing" problems, i.e. applications in which information is fed into a common sink from n sources according to a predetermined cyclic scheme, e.g. one information unit from each source in a prescribed order per multiplex cycle. With reference to FIG. 11 and the additions mentioned above, each of the feeder strings of nets is associated with an information source and is driven from the output lead of the decoding matrix corresponding to the prescribed order, whereas the receiver string is associated with the information sink. Also, the input pulses to the ring counter can be derived from lead 58(*i*+1) of net *i*+1 with obvious synchronization advantages, once relative operational delays are taken into account and properly compensated, if required, by using any of the schemes outlined earlier, e.g. in reference to FIG. 4.

Figure 12:
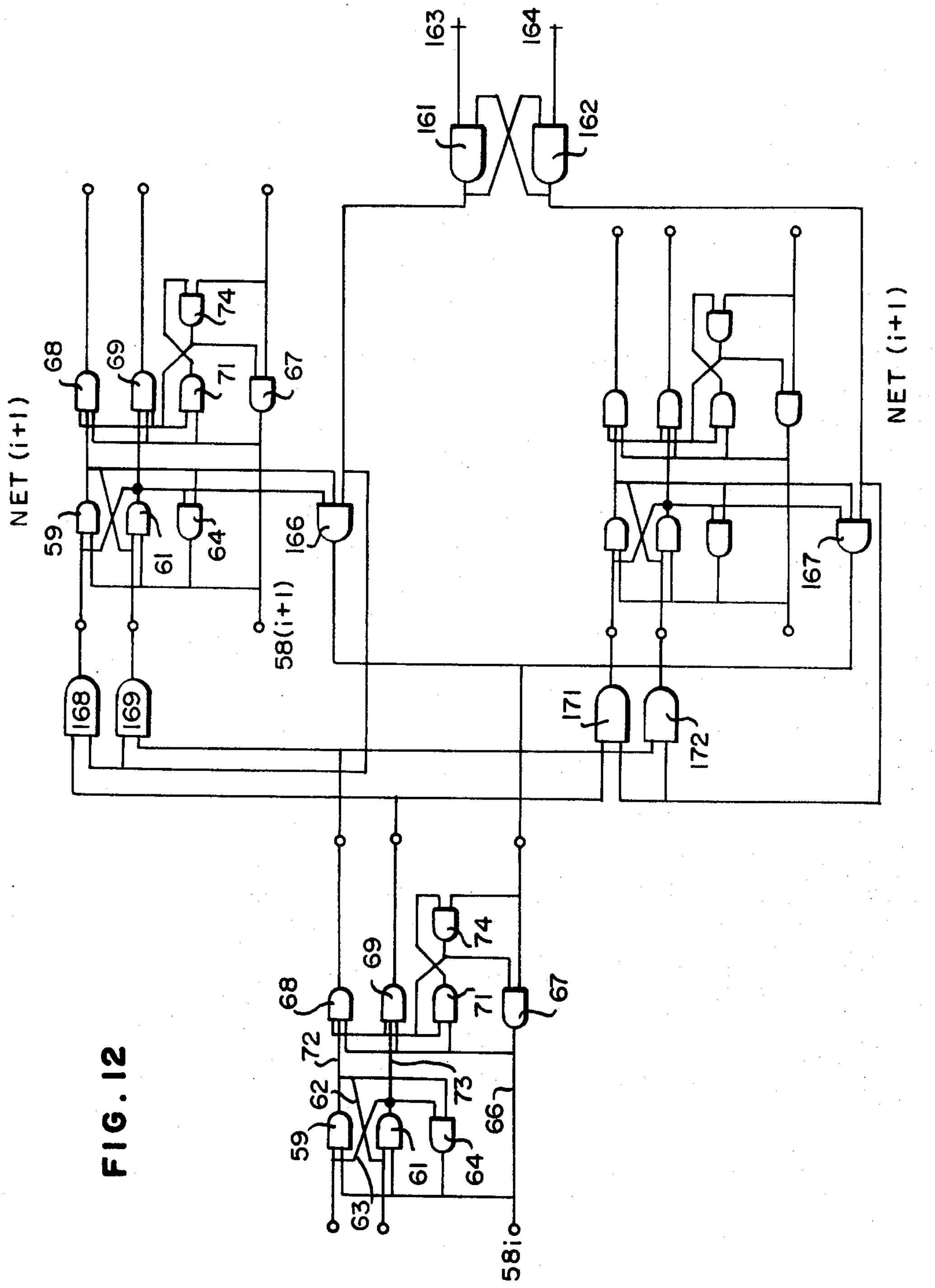
FIG. 12 illustrates a logic block diagram of a fan-out circuit (di-multiplexer) employing the circuit of FIG. 2.

Another application, complementary of the one discussed above, may require that a string of nets feed information to one of two other strings, (fan-out) as directed by some external control signal. FIG. 12 describes how problems of this kind can be solved. The Figure shows net *i*, the last net of the feeder string, and two nets *i*+1, the first nets of the receiver strings. The Figure also shows two cross-coupled NAND gates 161 and 162 and two additional gates 166 and 167. The output of gate 161 is connected as input to both gates 162 and 166; the output of gate 162 is connected as input to both gates 161 and 167. In addition gate 166 receives the same inputs as gate 64(*i*+1) of the top net *i*+1 and gate 167 receives the same inputs as gate 64(*i*+1) of the botton net *i*+1. Further gates 168, 169, 171 and 172 are shown inserted between the output leads 56*i* and 57*i* of net i and the input leads 57*i* and 56 *i* of both nets *i*+1 respectively. A further input to gates 168 and 169 is the output of gate 161 and a further input to gates 171 and 172 is the output of gate 162. External control inputs are received via lead 163 which is connected as input to gate 161 and via lead 164 which is connected as input to gate 162. Operation of the apparatus is as follows. Assume that a 0 signal is applied by the external source to the input of gate 161 (and a 1 signal is applied to the input of gate 162), so that the output of gate 161 becomes a 1 and the output of gate 162 becomes a 0. It is easy to see that in this case transmission of information between net i and the bottom net *i*+1 is effectively inhibited and transmission between net *i* and the top net *i*+1 is allowed, with the maximum rate of transmission being now decreased somewhat by the insertion of the gates 168 and 169.

If a 0 had been applied to the input of gate 162, the result would have been to inhibit transmission between net *i* and the top net *i*+1 and allow transmission between net i and the bottom net *i*+1, with the same conclusion regarding the transmission rate.

It should be noted that, while its transmission with the feeder string is inhibited, each of the receiver strings can still properly transfer information already in the string to the downstream nets in the same string. Also, by properly adding more gates to partially duplicate the function of existing ones (as was done with gates 166 and 167 to duplicate the functions of gates 64 of both nets *i*+1) the overall maximum transmission rate can be made equal to that of the feeder string. For instance, two pairs of four-input gates could be used to duplicate the function of gates 68*i* and 69*i*, one pair being to replace rates 168 and 169 in the top string and the other to replace gates 171 and 172 in the bottom string. The fourth input of the top pair of gates would be connected to the output of gate 161 and that of the bottom pair of gates would be connected to the output of gate 162.

Again, it is apparent that the above operation can be performed with any number of receiver strings, the number certainly not being limited to two as illustrated. All that would be required for a number n of receiver strings are three additional gates per string, connected in a manner similar to gates 166, 168, 169 of the top string or to gates 167, 171 and 172 of the bottom string in FIG. 12. Also, the flip-flop formed by cross-coupled gates 161 and 162 would have to be replaced by suitable circuitry. In particular cases, embodiment of such circuitry can take the form of a ring counter and associated decoding matrix, as explained earlier. Further, if the input pulses to the ring counter are derived from terminal 58(*i*+1) of the last stage (net *i*) of the feeder string, the resulting apparatus can be used to solve "demultiplexing" problems, i.e. applications in which information from a common source is to be fed to *n* sinks according to a pre-assigned, cyclic scheme. This problem is complementary to the multiplexing application described ealier and, since solutions and conclusions are similar, no further details are given here.

Again, the simplicity, elegance, speed, and reliability of the interfaces should be recognized.

Figure 13:
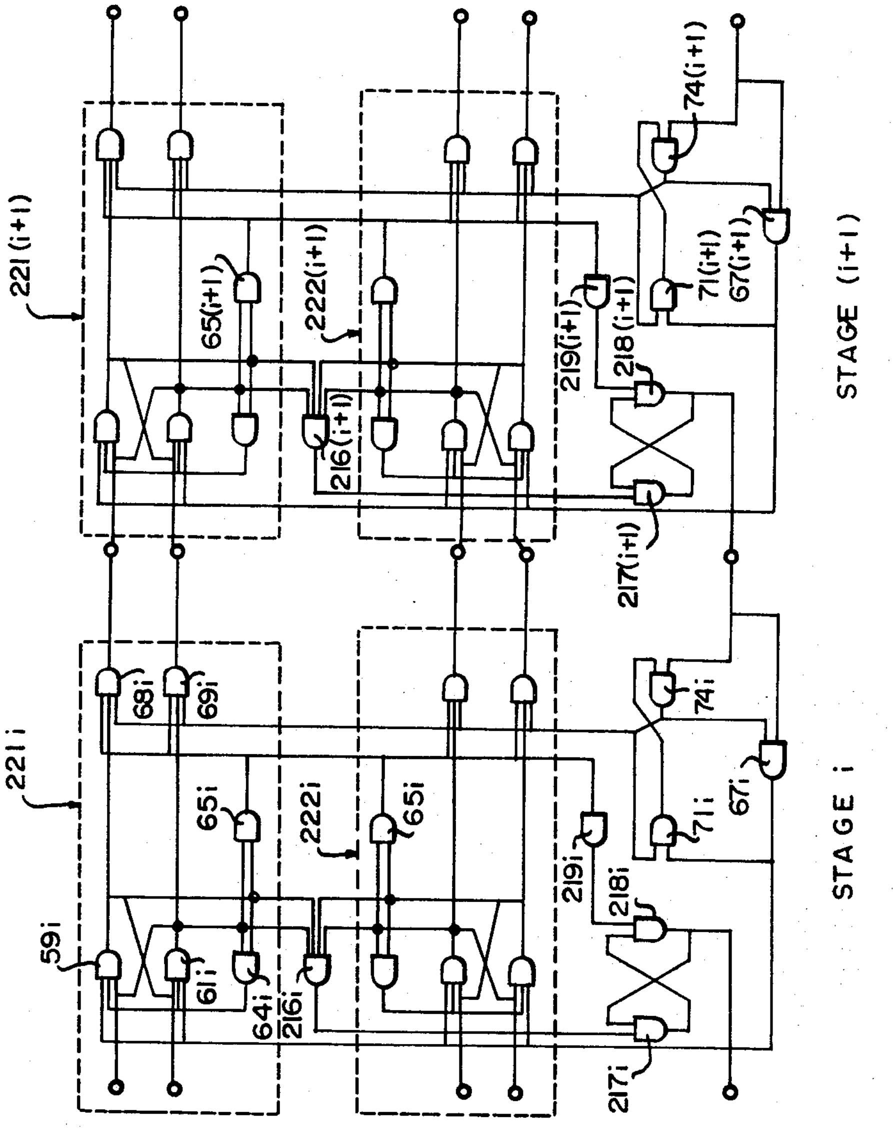
FIG. 13 illustrates a logic block diagram of two cascaded chains of circuits arranged in parallel and employing common control circuits to effect transfers of information between adjacent circuits in each chain concurrently in both chains.

There are applications involving several parallel strings of nets in which it is desired to maintain synchronization between corresponding units of information through all the stages of the strings, i.e. units of information entering the first stage of each string at the same time should step through (enter into and depart from) equally numbered stages downstream of each string at the same time. With reference to FIG. 13, which has been drawn for the case of two such strings, this means that corresponding units of information, one propagating through the upper string and the other propagating through the lower string, should step through stages *i* and *i*+1 at the same time. With reference again to FIG. 13, the elements pertaining specifically to one stage of the upper string are generally designed by the reference numeral 221 and those pertaining specifically to one stage of the lower string by the reference numeral 222. It will be recognized that all such groups of elements consist of the same number of gates all of which have correspondingly the same connections. Therefore, only the group 221*i* will be described in detail. Group 221*i* consists of six gates 59*i*, 61*i*, 64*i*, 68*i*, 69*i* and 65*i*, the first five of which are connected in the same manner and perform the same functions as in FIG. 2, with the following exceptions, all of which involve to some extent functions which in FIG. 2 are related to gate 64*i:*

*a*. The output of gate 64*a* is no longer connected as an input to gates 68*i* and 69*i*. The function of controlling information transfer out of net 221i is now performed by gate 65*i* which, in a sense, "doubles up" for gate 64*i*, since it has the same inputs as,but not necessarily the same outputs as gate 64*i*. In fact, gate 65*i* of net 221*i*, together with gate 65*i* of net 222*i*, performs the function of (partially) controlling the gating out of information from nets 221*i* and 222*i* to nets 221(*i*+1) and 222(*i*+1) respectively, since the outputs of gates 65*i* of both nets 221*i* and 222*i* are connected together and as inputs to gates 68*i* and 69*i* of both said nets.

*b*. Gates 59*i* and 61*i* have now each three inputs, two of which are connected as previously done in FIG. 2, and the additional one being connected to gate 67*i*. Thus, the previous connection between the outputs of gates 67*i* and 64*i*, as shown in FIG. 2, has now been removed in FIG. 13.

*c*. Gate 64*i* now performs only the function of providing a stable N state in group (or net) 221*i* by virtue of its cross-coupling with both gates 59*i* and 61*i*.

A control section comprised of three gates 67*i*, 71*i* and 74*i* and connected in the same manner as in FIG. 2, is used to perform functions similar to those performed in FIG. 2 or, more specifically, to control gating of information into nets 221(*i*+1) and 222(*i*+1) and to set both nets 221*i* and 222*i* to the N state after information transfer has been effected.

Four additional gates are shared by nets in the same stage, i.e. such as 221*i* and 222*i*. These are gates 216*i*, 217*i*, 218*i* and 219*i*. Gate 216*i* has four inputs, one each from gates 59*i* and 61*i* of each net 221*i* and 222*i*. Thus gate 216*i* will have a 0 output signal if both nets 221*i* and 222*i* are in the N state, it will have a 1 output signal otherwise. Gates 217*i* and 218*i* are cross-coupled to form a flip-flop. A second input to gate 217*i* is the output of gate 216*i*, whereas a second input to gate 218*i* is the output of gate 219*i*. This latter gate receives as its only input the combined outputs of both gates 65*i* of nets 221*i* and 222*i*. Thus, the flip-flop operation of gates 217*i* and 218*i* is such that the output of gate 218*i* is forced to become a 0 when both nets 221*i* and 222*i* go into the N state and is forced to become a 1 when both said nets go into the I state or, in other words, the flip-flop will "remember" whether nets 221*i* and 222*i* were both in the N or in the I states the last time that they were both in the same state.

The operation of the nets of FIG. 13 can be briefly described now as follows. Assume that all the nets of both strings are initially in the N state. In this situation the nets in stage *i* will accept information, when available, from the nets of a preceding stage *i*—1, whereas transfer from the nets in stage *i* to those in stage *i*+1 is inhibited by the combined action of gates 65*i* of nets 221*i* and 222*i*.

Assume now that valid information (i.e. a 0 or a 1) becomes available somehow in net 221*i* but not in net 222*i*. No transfer of this information to net 221(*i*+1) is effected, since gates 68*i* and 69*i* of both nets 221*i* and 222*i* are held closed by gate 65*i* and net 222*i*, which gate as yet has two 1's as inputs.

Assume now that both nets 221*i* and 222*i* are in the I state. Transfer of information to the nets of stage *i*+1 begins since all four gates 68*i* and 69*i* of both nets of the *i* stage are fully open (both gates 65*i* have 1's as outputs, and a 0 is provided by the output of gate 218($i$+1) thus causing the output of gate 74$i$ to be a 1 also).

Assume at this point that net 222($i$+1) is much faster than net 221($i$+1), i.e. net 222($i$+1) assumes the I state while net 221($i$+1) is lagging and is still in the N state. It is easy to see that no further actions can occur, namely net 222($i$+1) cannot transfer its information to its succeeding net 222($i$+2), transfer of information into net 221($i$+1) cannot be inhibited, and setting of any of the i-state nets to the N state cannot occur. The only event that can occur is that net 221($i$+1) also goes into the I state.

Assume now that both nets 221($i$+1) and 222($i$+1) just went into the I state. Then transfer of information to the nets of state $i$+2 begins and, at the same time, the output of gate 218($i$+1) becomes a 1, thus generating the conditions whereby the control circuitry formed by gates 67$i$, 71$i$ and 74$i$ generates a negative pulse at the output of gate 67$i$ (as described in regard to FIG. 3). This negative pulse forces the outputs of gates 59$i$ and 61$i$ of both nets 221$i$ and 222$i$ to assume 1 signals, thus forcing the output of gates 64$i$ in both said nets to assume a 0 signal, i.e. forcing both nets to go into the N state.

The above description shows that the nets of FIG. 13 accomplish the function of insuring that corresponding bits enter and leave nets of the same stage at the same time. In fact, information can enter such nets only if both nets are in the N state and can leave only if both are in the I state.

It is apparent that the above operation may be performed with any number of string of nets, the number certainly not being limited to two as illustrated. All that is required for the case of n such strings is to use strings of nets such as that generally designated by the reference numeral 221 to form n string each with the required number of stages, increase the number of inputs to gate 216 to a number equal to two times n and use a common section (gates 67,74 and 71, 217,218 and 219) per stage in a manner similar to that shown in FIG. 13.

Figure 14:
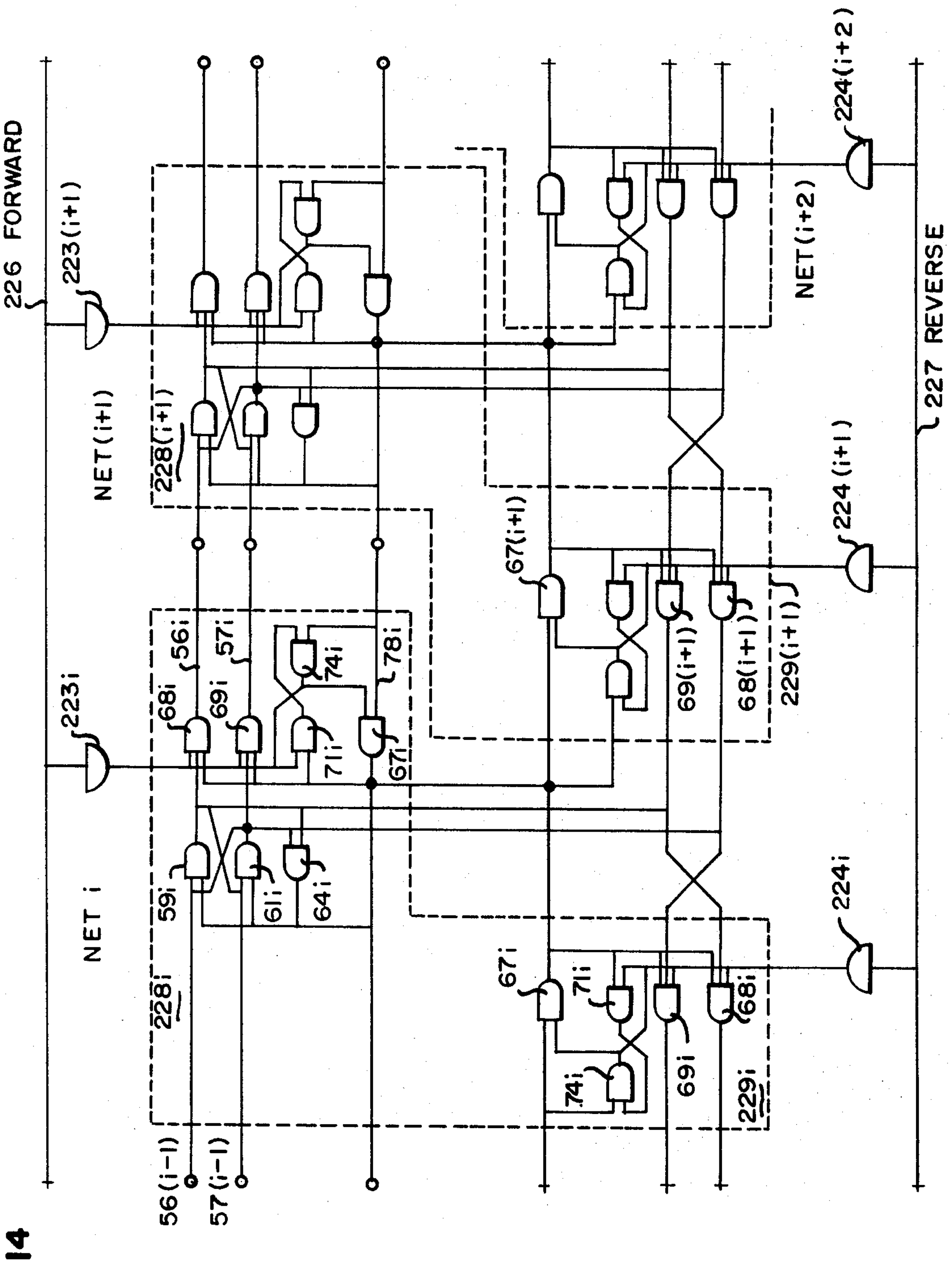
FIG. 14 illustrates a logic block diagram having cascaded circuits in which information may be transferred in either direction.

In many practical applications it is desirable to reverse the flow of information in a series or string of nets. With the nets of the present invention this task is easily accomplished with the arrangement shown in FIG. 14. With reference to FIG. 14, there are shown two rows of networks. The top row is identical to FIG. 2 except for some additional connections as will be described later. These nets are generally indicated by the numeral 228, and their elements (gates, leads and terminals) are denoted by the same numerals as in FIG. 2. Each of the networks shown on the bottom row is obtained from a net of the present invention by eliminating the storage section, namely gates 59, 61 and 64. The bottom nets are generally indicated by the numeral 229 and their elements are correspondingly indicated by the same numerals as in FIG. 2 (or the nets 228 of FIG. 20). It will be noticed that the nets 229 are turned around by 180°. Also, their connections are such that net 228$i$ "shares" the storage section with the nets 229$i$, so that, with the addition of such storage section the nets 229 form "reverse-flow" string of nets, i.e. they form a string of nets whereby information flows from right to left (e.g. from net $i$+1 to net $i$). In addition, the output of gate 74$i$ of net 228$i$ is connected to the putput of an inverting gate 223$i$, and the output of gate 74$i$ of net 229$i$ is connected to another inverting gate 224$i$. All the inputs of the gates 223 are connected to a common bus 226, and all the inputs of the gates 224 are connected to another common bus 227.

Operation of the apparatus shown in FIG. 14 is as follows. Whenever it is desired to achieve normal, left-to-right, information flow, a 0 signal is applied to bus 226 and a 1 signal is applied to bus 227. Thus, the nets 229 are effectively disabled and the nets 228 perform in the usual way. It will be noticed that this method of disabling some nets while leaving other interconnected nets enabled is similar to that of FIG. 11, and therefore it will not be discussed again here. If, on the other end, it is desired to achieve "reverse," right-to-left, flow of information, a 0 signal should be applied to bus 227 and a 1 signal to bus 226, thus enabling the nets 229 and effectively disabling the nets 228.

It is obvious that reversal of the direction of information flow should not be attempted while information is still propagating in the string of nets. Subsiding of information flow can be detected using any of the methods suggested in reference to parallel read-out of a string of nets. For instance, the method illustrated in FIG. 9 may be used.

Remarkably high speed operation can be achieved in parallel circuits by the elimination of the transfer gates 68 and 69 from nets; such occuring with a high degree of concurrent and yet hazard-free operation.

Figure 15:
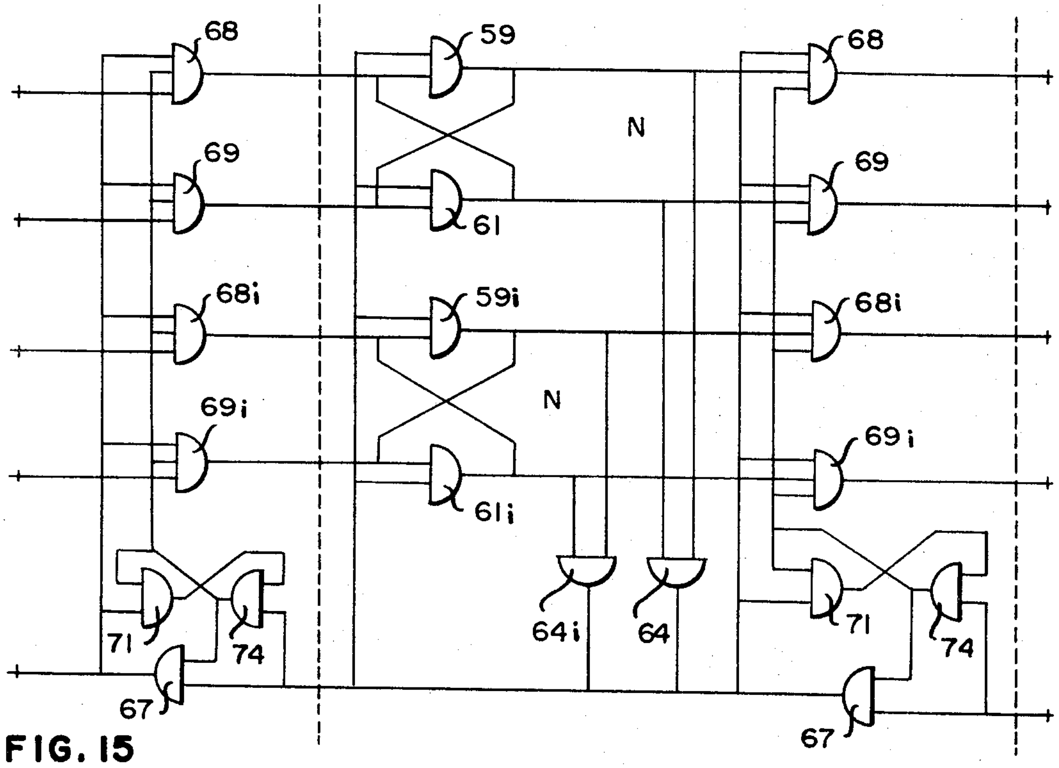
FIG. 15 is a logic block diagram of two cascaded chains in which transfer between all stages in each chain is effected concurrently in both said chains.

In line with the above and for those applications in which speed is the primary concern, an alternate circuit configuration is given for the arrangement of FIG. 13, which shows a possible solution to the problem of maintaining synchronization between units of information entering different strings of nets at the same time. The new arrangement is shown in FIG. 15. With reference to FIG. 15, it is seen that a stage of the composite string is formed essentially by having two stages like those shown in FIG. 2 share a common control circuit. It is easily seen that information is allowed to enter a composite stage as long as the output of one of the gates in position 64 in the storage sections is 0, and is allowed to exit such composite stage only if the outputs of both gates 64 and 64$i$ are 1's. Also, both storage sections of a preceding composite stage are set to the N state whenever the outputs of both gates 64 and 64$i$ of a stage assume the value 1 from a previous situation in which at least one gate had output 0.

The arrangement of FIG. 15 has the advantage of less circuitry and a higher transfer rate (six vx. eight gate-delays) over the arrangement of FIG. 13. Its chief disadvantage is that no storage section can exist in a true I state whenever the other one is in the N state, so that valid information must be held at the input terminals of both storage sections until they both assume the I state (the outputs of both gates 64 become 1's) for reliable operation. This requirement causes no problems at the internal interfaces in a string of such nets, but for some applications it could become a serious operational restriction as far as the interfaces with external devices are concerned.

It is apparent that the arrangement of FIG. 15 can be extended to the case of more than two storage sections per composite stage. A comparison of such extended stages with those derived by a corresponding extension of the nets of FIG. 13 would lead to conclusion analogous to those reached above in regard to the nets of FIG. 15 and those of FIG. 13.

Figure 16:
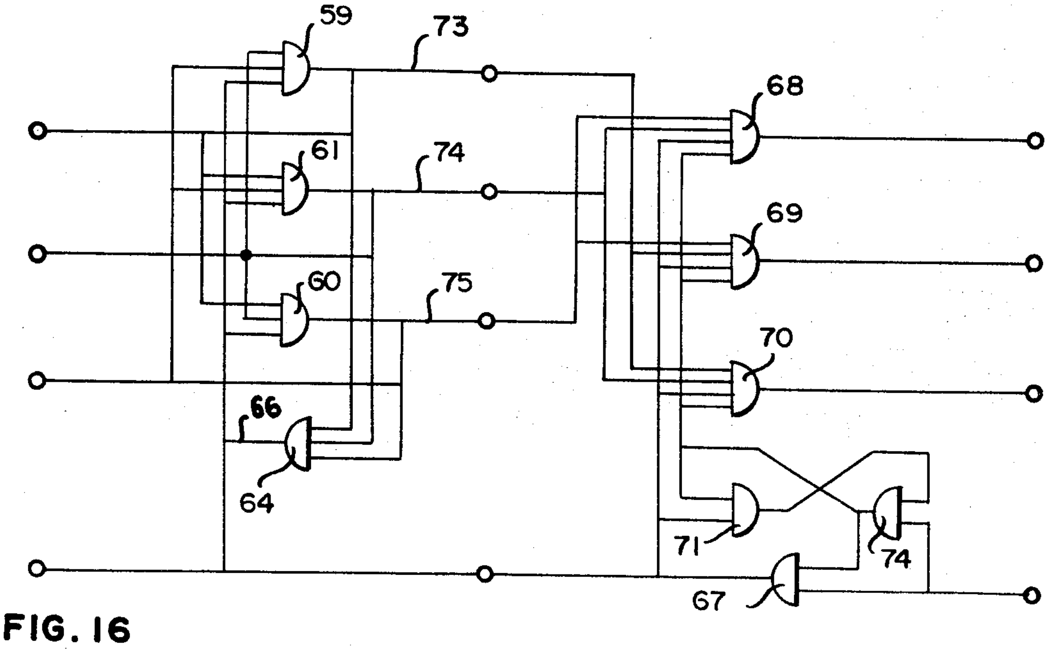
FIG. 16 illustrates a circuit of the present invention employing ternary logic.

A further extension of the basic concept of the nets of the present invention is shown in FIG. 16. With reference to FIG. 16, there is shown an extension of the storage section to the case of four stable states, three of which are used to carry valid information and the fourth being used again to represent a neutral, no-information state "N." The four stable states correspond to the situations whereby the output of one of the four gates 59, 61, 60 and 64 is 0 and the other three are 1's. In analogy with the state assignments used for the nets of FIG. 2, the stable states of the nets of FIG. 16 will be labelled 0, 1, 2 and N according to whether gates 59, 61, 60 or 64 has output 0. Also, the state 0, 1, and 2 will be collectively called the information or valid states and denoted with the symbol I in contrast to the no-information or neutral state N.

Table II below illustrates the state assignments for the output leads of the gates 59, 61, 60 and 64 respectively.

TABLE II

| State | 73 | 74 | 75 | 66 |
|---|---|---|---|---|
| 0 | 0 | 1 | 1 | 1 |
| 1 | 1 | 0 | 1 | 1 |
| 2 | 1 | 1 | 0 | 1 |
| N | 1 | 1 | 1 | 0 |

The internal operations and the information transfer mechanism of the nets of FIG. 16 are very similar and are derived as a simple and natural extension of those already described for the nets of FIG. 2 and occur at the same rates. Also, interface operations like serial and parallel feed-in and feed-out of information, fan-in, fan-out, recirculating information loops, fan-in and fan-out switching, bi-directional information flow for the nets of FIG. 16 are very similar and are derived as a simple and natural extension of the same operations as they have already been described for the nets of FIG. 2.

It is apparent that the arrangement of the nets of FIG. 16 can be further extended to the cases in which the memory section can have $n$ ($n > 4$) stable states, of which $n-1$ states can be used to carry valid information and one state can be used to denote the no-information or neutral state.

These extended nets, with more than three stable states, not only have possible natural applications in logic systems with numerical bases higher than two, (i.e. ternary, quaternary, etc., numbering systems) but also can be used to carry special information symbols in binary systems. For instance, in the nets of FIG. 16 the information state "2" can be used to indicate such "housekeeping" information as "end-of-word," end-of-message," etc., and to determine the mode of operation of such network arrangements as fan-in and fan-out switches, bi-directional flow-nets and so on. Furthermore, very efficient encoding schemes based on the availability of this extra state can be developed to enhance processing of information and error detection and correction in a noisy environment.

Figure 17:
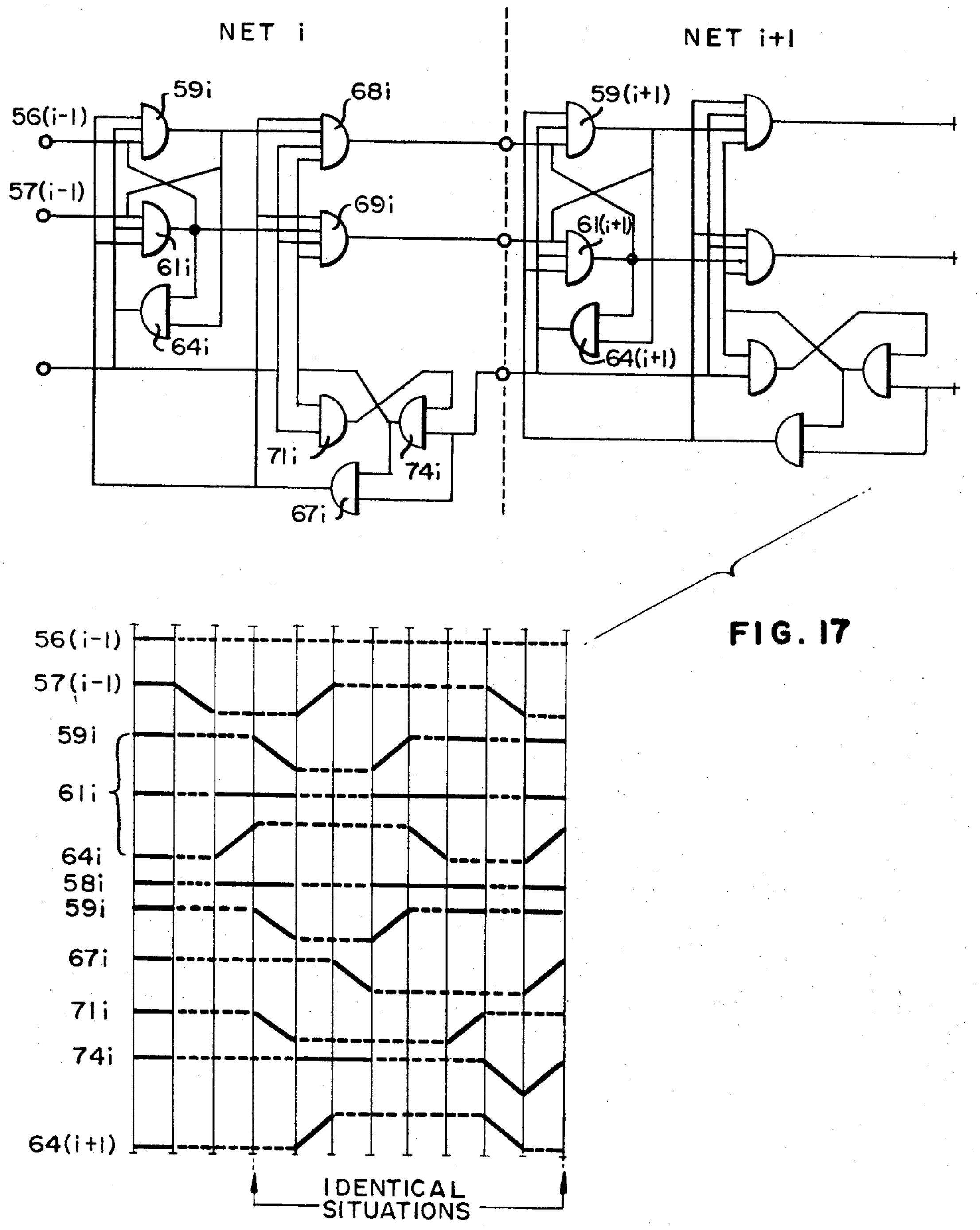
FIG. 17 illustrates a modification of the binary logic circuit of FIG. 2.

As it has been shown thus far, the high speed of operation for the nets of the present invention is achieved by letting several events take place simultaneously and reliable operation is achieved by "feedback," i.e. by properly sensing the start, progress and termination of key events. It is apparent that some variations of the basic circuit are possible to improve speed and/or reliability of operation. For instance, a variation of the basic circuit of FIG. 2 is shown in FIG. 17. It will be recalled that in a string of nets, as soon as net $i+1$ receives valid information from a net $i$, the latter is set to the N state by a negative pulse from gate 67 of the control section of net $i$. Although the width of such a pulse is quite safe (three gate delays vs. two actually required), no feedback is used to sense that such an event has indeed taken place before the negative pulse is terminated in the circuits of FIG. 2. With reference to FIG. 24 there is shown a new circuit configuration which is very similar to that of FIG. 2 except that the outputs of gates 64 and 67 are no longer connected together. In the circuit of FIG. 16, the output of gate **64*i* is connected as input to gates 67($i-1$) and 74($i-1$) of the preceding net and to gates 59*i*, 61*i*, 68*i*, 69*i* and 71*i* of net $i$ (as in FIG. 2); whereas the output of gate 67*i* is connected as input to gates 59*i*, 61*i*, 68*i* and 69*i*. As a consequence, the gates 59, 61, 68 and 69 have one more input lead in the nets of FIG. 17 as compared to the nets of FIG. 2. In addition, several graphs are shown in FIG. 17 to illustrate the output waveforms of those gates which bear the same reference numerals. It is apparent in FIG. 17 that the negative pulse ensuing at the output of gate 67*i* (upon net $i+1$ receiving valid information from net $i$) is five gate delays wide and it requires that the output of gate 64*i* becomes a 0** (net $i$ assumes the N state) before the pulse can terminate.

It also can be seen that the remainder of the events taking place in the nets of FIG. 17 are very similar to those taking place in the nets of FIG. 2 and therefore no further details will be given in regard to the operation of the nets of FIG. 17. The only additional remark to be made is that an operation cycle for the nets of FIG. 17 involves eight gate delays as compared with six for the nets of FIG. 2.

In the above description of the circuits and systems of the present invention, the apparatus is described as employing a specific type of NAND gate. The use of the specific type of NAND gate disclosed and the use of NAND logic are both not essential to operation of the apparatus. The use of NAND logic and the specific gate do impart simplicity to the circuit and thus increase its speed. The specific NAND gate permits direct coupling of the output leads of two such gates even under circumstances where the states of the input leads of the gates specify different output functions. If other types of NAND gates are to be employed buffering of the outputs should be employed to provide isolation of the gates. Further the logic functions of the circuit may be accomplished by NOR gates or OR gates plus inversion. However again additional gates may be required in this type of logic than in the NAND logic with a corresponding reduction in speed of operation.

The circuit of the invention is described in FIG. 2 as employing binary logic and in FIG. 16 as employing ternary logic.

It is apparent that any level of N-ary logic may be developed by the simple addition of one storage gate and one output gate per increase in the base number. Thus in FIG. 2 a single three gate storage section and 2 gate output section is employed; in FIG. 16, a four gate storage section and a three gate output section is employed. The next N-ary level is added by adding a further gate to the storage section and to the output section. If sufficient storage and output gates are employed, the levels of the control signals may have to be amplified but this factor becomes a problem only when the normal fan-out capability of the NAND gates is exceeded.

There has also been disclosed in FIG. 2 a circuit which under normal aging and related problems does not generate serious pulse races. There are environments, such as in high temperature work or in the space field where extended periods of continuous operation is required, wherein the individual gates may change characteristics sufficiently that pulse races could occur. FIG. 17 illustrates a circuit which eliminates such a problem in one area of the device. Similar techniques or addition of gates may be employed to eliminate all forseeable race problems.

The systems disclosed herein deal with both translation of information and processing of information concurrently with or independently of translation. Thus in the translation area there have been disclosed serial transfer, serio/parallel transfer and vice versa, fan-in (multiplexing for instance), fan-out (demultiplexing) and in-step, serial transfer in parallel cascades. Each of these systems finds applicability in the data handling arts.

It is apparent from the above that the circuit or circuits of the present invention provide an exceedingly flexible data handling and processing tool from which may be realized many high speed systems for data translation and processing while retaining substantially complete independence from surrounding circuits and retaining an unusually high degree of reliability.

Figure 18:
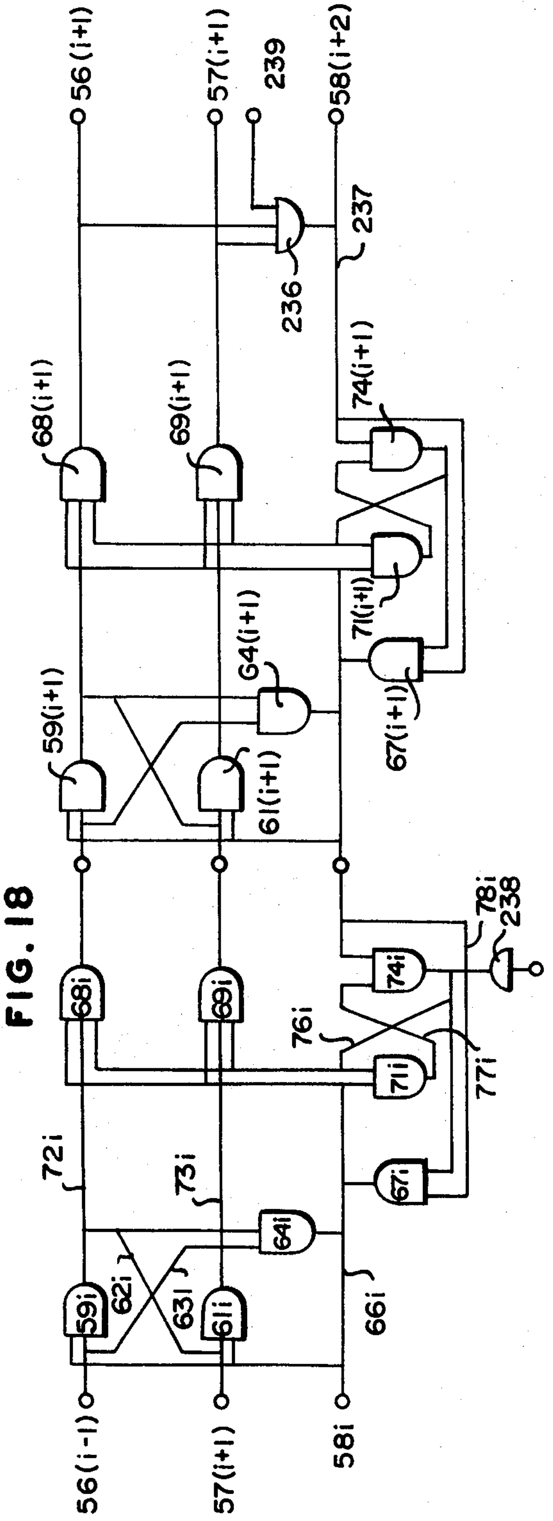
FIG. 18 is the circuit diagram of FIG. 2 with clear and hold gates added.

Referring now specifically to FIG. 18 of the accompanying drawings, there is illustrated a net of the present invention having a circuit for clearing all or any selected part of the information stored in a given chain of nets. The circuit of FIG. 2 has added thereto a NAND gate 236 having its output lead 237 connected to terminal 58(*i*+2) of FIG. 18. It will be noted that FIG. 18 is identical with FIG. 2 except for the addition of the gate 236 and the addition of a further gate 238 which applies signals to the gate 67*i*.

The NAND gate 236 has three input leads, one connected to terminal 57(*i*+1), a second input lead connected to terminal 56(*i*+1), a third lead connected to a terminal 239 to which may be applied gating or clear signals, depending upon the conditions under which the signal is applied.

In operation, if a zero or grounded signal is applied to the terminal 239, a one is forced to appear at the output lead 237 and the control gates 67(*i*+1), 71(*i*+1) and 64(*i*+1) assume the initial or starting conditions illustrated in the graph of FIG. 3 of the accompanying drawings. Specifically a 0 appears at the output of the gate 74(*i*+1) and a 1 appears at the output of the gate 67(*i*+1). A 0 is applied to the output gates 68(*i*+1) and 69(*i*+1) from the gate 74(*i*+1) and the output gates are closed. Thus 1's appear at the output terminals 56(*i*+1) and 57(*i*+1) which, due to the 0 applied to the terminal 239 cannot change the condition of the signal on the lead 237.

If it is assumed that information is applied at the terminals 56*i* and 57*i*, serving as input terminals to the second stage of the chain, then a signal appears at the output of the gates 59(*i*+1) and 61(*i*+1, that is, one of the leads has a 0 and one of the leads has a 1. If now it is desired to clear the system, a 1 is applied to the terminal 239. Since the gates 68(*i*+1) and 69(*i*+1) have been closed and 1's appear on two of the input leads to the gate 236, the application of a 1 to the terminal 239 causes a 0 to appear on the lead 237. The gate 74(*i*+1) now produces a 1 at its output terminals and the output gates 68(*i*+1) and 69(+1) are opened and information is transmitted to the outside world. The condition at the input leads to the gate 236 is now changed since one of the leads now has a 0 applied thereto and thus a 1 is re-established on the lead 237 closing the gates 68(*i*+1) and 69(*i*+1) and informing the next stage upstream from the output stage to transmit information to the output stage. If the terminal 239 remains in the 1 state as soon as information is applied to the gates 59(*i*+1) and 61(*i*+1) the information re-opens the gates 68(*i*+1) and 69(*i*+1) via the gate 74(*i*+1) and the entire cycle repeats itself.

This cycle will repeat until all information is transmitted out of the chain and the terminals 56(*i*+1) and 57(*i*+1) assume a permanent neutral condition due to no further information. Once transmission of information down the chain terminates, the signal may be removed from the terminal 239 and further transmission inhibited.

It may be desirable to limit the portion of a chain from which information is extracted. It is assumed for purposes of illustration that the i stage of FIG. 18 is somewhat upstream from the (*i*+1) stage of FIG. 18, that is, there are several stages in between, and it may also be assumed that there are further stages upstream of the i stage. It may be desired not to clear the information from the stages upstream of the *i* stage. In order to prevent the extraction of such information, a single input NAND gate 238 has its input connected to the lead 76*i*. If a 1 is applied to the gate 238 the output is a 0 and the lead 76*i* is held at 0. Therefore the gates 68*i* and 69*i* cannot be opened and transmission from this stage and upstream thereof cannot be effected. Thus the addition of the single gate 238 permits selection of the portion of the system that will be cleared.

While I have described and illustrated several specific embodiments of my invention, it will be clear that variations of the details of construction which are specifically illustrated and described may be resorted to without departing from the true spirit and scope of the invention as defined in the appended claims.

What I claim is:

1. An asynchronous circuit comprising a storage section, an output gate section and a control section, said storage section having multistable gate means providing at least three stable states, at least two information states and a neutral state; said control section having a first stable state; a number of information output leads equal in number to the number of information states of said storage section; said gate section being disposed between said storage section and said output leads; said gate section being responsive to signals developed by said control section when in said first stable state to develop on said output leads, signals indicative of the state of said storage section; means for switching said control section to an unstable state; said gate section being responsive to signals developed by said control section when in said unstable state to cause said gate section to develop on said output leads signals indicative of the neutral state of said storage section; said storage section including means responsive to said unstable state of said control section to cause said storage section to assume its neutral state and means for causing said control section to assume a further stable state when said storage section assumes said neutral state.

2. An asynchronous circuit according to claim 1 wherein is provided a plurality of said asynchronous circuits, each of said storage sections having a number of input leads equal in number to said output leads, said input leads of one of said circuits being connected on a one-for-one basis to the output leads of each of the other of said circuits, means connected to each of said other of said circuits to determine when information is to be transferred to said one of said circuits from any one of the other of said circuits, said last mentioned means being responsive to transfer of information to said one circuit to enable transfer of information from another of said other circuits to said one circuit in sequence.

3. An asynchronous system according to claim 1 wherein is provided a plurality of said asynchronous circuits, each of said storage sections having a number of input leads equal in number to said output leads, means connecting said output leads of one of said circuits to said input leads of the other of said circuits on a one-for-one basis, means for sensing receipt of information from said one circuit by any of said other of said circuits, said sensing means producing transfer signals to said connecting means sequentially and successively, said connecting means being responsive to receipt of a transfer signal from said sensing means and a signal indicative of the neutral state having been obtained in the storage section of that one of the other of said circuits which has been selected by said sensing means to next receive information from said one of said circuits, to transfer information to said that one of the other of said circuits.

4. An asynchronous system for transmitting information in a forward direction comprising first and second asynchronous circuits each including a control section, a storage section, an output section, and an equal plurality of input leads and output leads, each said storage section having a plurality of gate means interconnected to provide a number of stable states equal to one more than said input leads, said stable states consisting of a neutral state and a plurality of information states, each said gate section being disposed between said storage section and said output leads of its associated circuit, output leads of said first circuit being connected to input leads of said second circuit on a one-for-one basis; said control section of said first circuit developing a first stable state signal when said second circuit is in its neutral state, said gate section being responsive to said signal to develop on said output leads signals indicative of the state of said storage section, means responsive to transfer of an information state to said second circuit for switching said control section to an unstable state, said control section producing when in said unstable state a second signal, said gate section developing signals on said output leads indicative of the neutral state of said storage section in response to receipt of said second signal, said storage section having means responsive to said second signal to switch said storage section to its neutral state and said control section being responsive to said storage section achieving the neutral state to switch said control section to a stable state.

5. An asynchronous system according to claim 4 wherein said storage sections comprise a plurality of NAND gates each having a number of input leads equal to one less than the number of NAND gates and each having one output lead; each NAND gate having its output lead connected to a different input lead of each of the other of said NAND gates, the output lead of a first NAND gate being connected to receive said second signal from said control section, and the output leads of the other of said NAND gates each being connected to receive input information.

6. An asynchronous system according to claim 5 wherein each of said control sections comprises three NAND gates, each having two input leads and an output lead, one of said NAND gates having its output lead connected to an input lead of each of the other two NAND gates, a second of said NAND gates having its output lead connected to an input lead of said one of said NAND gates, another input lead of each of said one NAND gate and of the third of said NAND gates being connected together, and means responsive to signals on at least the output lead of the third of said NAND gates for applying signals to the other input lead of the second of said NAND gates.

7. An asynchronous system according to claim 6 wherein said one NAND gate of said control section of said first circuit is connected to the output lead of said first NAND gate of said storage section of said second circuit and wherein said output lead of said third of said NAND gates of said control section of said first circuit is connected to the output lead of said first NAND gate of said storage section of said first circuit.

8. An asynchronous system according to claim 5 wherein said storage section comprises 3 NAND gates.

9. An asynchronous system according to claim 5 wherein said storage section comprises at least 4 NAND gates.

10. An asynchronous circuit according to claim 4 wherein is provided a plurality of said systems, means for generating a gate signal upon determining concurrent storage of information in said second circuits of each of said systems, and means for applying said gate signal to said control section of each of said second circuits to operate their associated gate sections to gate out information stored in said second circuits of said systems.

11. An asynchronous system according to claim 4 comprising means for extracting information in parallel concurrently from said asynchronous circuits, said means for extracting comprising means for sensing transfer of information between said asynchronous circuits, said means for sensing developing a gate signal upon occurrence of a predetermined event in transfer of information between said asynchronous circuits, output means connected to the output leads of each of said asynchronous circuits to sense the state of each said asynchronous circuit, and means responsive to said gate signal for causing said output means to transfer information to an external circuit in accordance with the state of each said asynchronous circuit.

12. An asynchronous system according to claim 4 wherein said storage section comprises a plurality of NAND gates equal in number to one more than the information states of said storage section, each said NAND gate having a plurality of input leads and one output lead with connections such that the output lead of each of said NAND gates is connected to a different input lead of all the other said NAND gates.

13. An asynchronous system according to claim 12 further comprising means for transmitting information in a reverse direction, said last mentioned means including a plurality of second control sections and second gate sections having output leads, said second gate sections connected in series to transmit information in a direction opposite to the direction information is transmitted by said first mentioned gate sections, said second control sections controlling transmission of information through said second gate means, means connecting said output leads of said second gate sections to said output leads of said plurality of NAND gates on a one-for-one basis, means for selectively and exclusively enabling said first mentioned gate sections and means for selectively and exclusively enabling said second gate sections.

14. An asynchronous system according to claim 4 wherein said control sections each includes means for establishing a first and a second stable state in said control section, said means for establishing being responsive to switching of its associated storage section from an information state to its neutral state and to said storage section of the succeeding circuit being in said neutral state for establishing therein said first stable state, said means for establishing being further responsive to switching of its associated storage section from an information state to said neutral state and to said storage section of the succeeding circuit being in an information state for establishing therein said second stable state, said gate section being connected to respond to said second stable state of its associated control section to establish on its output leads signals indicative of the neutral state of its associated storage section.

15. An asynchronous system according to claim 4 further comprising a circuit for applying information in parallel concurrently to said storage sections of said circuits of said system, said circuit for applying information in parallel comprising for each asynchronous circuit, input gate means responsive to an input signal representing an information state of an asynchronous circuit for generating a plurality of information signals equal in number to said input leads of each said asynchronous circuits, said input gate means for each said asynchronous circuit being responsive to a common gate signal to transfer said information signals to said input leads of its associated storage section.

16. The combination according to claim 4 further comprising means for clearing said asynchronous system which comprises means for causing said second circuit to appear to the first circuit to be in the neutral state regardless of the condition of storage of information therein.

17. A plurality of chains of asynchronous circuits in which transfers of information between corresponding asynchronous circuits in each of said chains are affected concurrently, each of said circuits comprising a storage section and a gate section, said storage sections each comprising a plurality of interconnected logic gates providing a number of stable information states and one stable neutral state, a plurality of information input leads equal to the number of information states of said storage section, each of said asynchronous circuits having output leads equal to said input leads and an output gate section for controlling transfer to said output leads of signals indicative of the state of said storage section, means connecting said output leads to storage sections so as to provide at least two parallel chains of cascaded asynchronous circuits each chain having at least a first and a second asynchronous circuit, a plurality of control circuits, there being one control circuit for the corresponding storage and gate sections in each of said parallel chains, said control section having a first stable state, a second stable state and an unstable state, sensing means responsive to an information state in all of said corresponding storage sections of said second circuits of said chains for generating a first signal for establishing said first stable state in said control circuit associated with said first circuits of said chain, said gate means of said first circuits being responsive to said first stable state of said control section of said first circuits to establish on its associated output leads signals indicative of said neutral state, said sensing means being responsive to the neutral state being attained by each of said storage sections of said second circuits of said chains to switch said control section of said first circuits to said second stable state, said gate section being responsive to the second stable state of its associated control circuit to establish on said output leads signals indicative of the states of said storage sections of said first circuits, whereby information may be transferred to said storage sections of said second circuits, said sensing means generating said first signal in response to receipt of information by all said storage means of said second circuits, said control circuit of said first circuits including means responsive to said first signal being reestablished to switch to said unstable state and subsequently switch to said first stable state, said gate section being closed by both said latter states and said storage sections being responsive to said unstable state to switch to said neutral state.

18. An asynchronous circuit according to claim 17 wherein said storage means includes said sensing means and wherein said sensing means produces said first signal when all of said storage sections are storing information.

19. An asynchronous circuit according to claim 17 wherein said sensing means comprises first gate means for producing a first control signal when any of said storage sections of said second circuits are in the information state, a plurality of second gate means each connected with a storage section of a different one of said second circuits to produce a second gate signal when its associated storage section is in an information state, said sensing means further comprising logic means responsive to said first control signal and to all of said second gate means producing said second gate signals to switch said control section of said first circuits to said first stable state.

20. An asynchronous circuit comprising a storage section capable of assuming at least three stable states, at least two information states and a neutral state; an output section and a control section, said storage section connected to provide on a number of output leads signals indicative of said at least three stable states, said control section having a first stable state; a number of output terminals equal in number to the number of output leads of said storage section; said output section being disposed between said storage section and said output terminals; means for applying signals on said output leads to said output section, said output section being responsive to signals developed by said control section when in said first stable state to develop on said output terminals signals indicative of the signals applied thereto; means for switching said control section to an unstable state; said output section being responsive to signals developed by said control section when in said unstable state to develop on said output terminals signals indicative of the neutral state of said storage section; said storage section including means responsive to said unstable state of said control section to cause said storage section to assume its neutral state and means for causing said control section to assume a further stable state when said storage section assumes said neutral state.

21. In combination, a source of information signals capable of assuming a variety of conditions, an information storage means and an information transfer means, said information storage means including means capable of assuming various information identifying conditions and at least one neutral non-information carrying condition, said source including means capable of assuming said conditions, said information transfer means including means for inducing in said storage means an information carrying condition as a function of an information carrying condition of said source, additional means producing internally generated signals indicative of various states of said transfer and storage means, said internally generated signals including a first signal generated when said storage means is in a neutral state, and a second signal generated upon response of said storage means to information transfer from said transfer means; and in response only to said internally generated signals, said means for inducing being responsive to only said first signal to apply information to said storage means, and said source including further means responsive only to said second signal to cause said source to assume a neutral condition and thereafter to permit said source to assume another information carrying condition.

22. An asynchronous circuit comprising a storage section, an output gate section, a control section and an information output lead, said storage section including at least one storage flip-flop having an output lead, said flip-flop establishing either of two possible signals on said output lead depending upon the state of said flip-flop, an output gate of said output gate section disposed between said output lead of said flip-flop and said information output lead, said control section having means for establishing first and second control signals, said output gates being responsive to a first of said control signals to open said gate and establish on said information output lead a signal indicative of the signal on said flip-flop output lead and means responsive to said second signal of said control section to close said output gate and reset said storage flip-flop to a predetermined condition to establish a specified one of said two possible signals on said flip-flop output lead.

23. An asynchronous system for transmitting information comprising first and second asynchronous circuits each including a control section, a storage section comprising at least one flip-flop, an output gate section and an equal plurality of input and output leads, each said asynchronous circuit establishing signals indicative of information and neutral states, said output gate section being disposed between said storage section and said output leads of its associated asynchronous circuit, output leads of each said asynchronous circuit being connected to input leads of the other of said asynchronous circuit, on a one-for-one basis, means for producing a first signal indicative of transfer of information to said first asynchronous circuit, means for producing a second signal indicative of said second asynchronous circuit being in a neutral state, said control circuit of said first asynchronous circuits being responsive to said first and second signals to open said gate section of said first asynchronous circuit to transfer information to said second asynchronous circuit, means responsive to transfer of information to said second asynchronous circuit for generating a third signal, said control circuit of said first asynchronous circuit being responsive to said third signal to close said gate section and reset said flip-flop of said first asynchronous circuit to a predetermined state.

24. An asynchronous system for transmitting information comprising first and second asynchronous circuits each including a control section, a storage section for storing information carrying a signals, an output gate section and an equal plurality of input and output leads, each said asynchronous circuit establishing signals indicative of information and neutral states, said output gate section being disposed between said storage section and said output leads of its associated asynchronous circuit, output leads of each said asynchronous circuit being connected to input leads of the other of said asynchronous circuit, and a one-for-one basis, means for producing a first signal indicative of transfer of information to said first asynchronous circuit, means for producing a second signal indicative of said second asynchronous circuit being in a neutral state, said control circuit of said first asynchronous circuits being responsive to said first and second signals to open said gate section of said first asynchronous circuit to transfer information to said second asynchronous circuit, means responsive to transfer of information to said second asynchronous circuit for generating a third signal, said control circuit of said first asynchronous circuit being responsive to said third signal to close said gate section and for establishing in said storage section a predetermined signal.

* * * * *